United States Patent
Burger et al.

(10) Patent No.: US 9,747,334 B2
(45) Date of Patent: *Aug. 29, 2017

(54) MANAGING EXCESS CAPACITY OF DATABASE SYSTEMS IN A CAPACITY CONTROLLED COMPUTING ENVIRONMENT

(75) Inventors: Louis Burger, Escondido, CA (US); Douglas P. Brown, Rancho Santa Fe, CA (US); Thomas Julien, San Diego, CA (US); Frank Roderic Vandervort, Ramona, CA (US)

(73) Assignee: Teradata US, Inc., Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 13/250,150

(22) Filed: Sep. 30, 2011

(65) Prior Publication Data

US 2013/0085984 A1 Apr. 4, 2013

(51) Int. Cl.
| | | |
|---|---|---|
| G06F 7/00 | (2006.01) | |
| G06F 17/00 | (2006.01) | |
| G06F 17/30 | (2006.01) | |

(52) U.S. Cl.
CPC .. *G06F 17/30442* (2013.01); *G06F 17/30471* (2013.01)

(58) Field of Classification Search
CPC .. G06F 17/30306; G06F 17/3089; G06F 9/46; G06F 17/30471; G06F 17/30094; G06F 17/30442; G06F 17/3056; G06F 17/30445; G06F 17/30619
USPC ................................ 709/226; 705/7; 718/104
See application file for complete search history.

(56) References Cited

U.S. PATENT DOCUMENTS

| | | | |
|---|---|---|---|
| 6,011,838 A * | 1/2000 | Cox | 379/112.06 |
| 7,395,537 B1 * | 7/2008 | Brown | G06F 17/30306 |
| | | | 707/999.001 |
| 7,734,765 B2 * | 6/2010 | Musman et al. | 709/224 |
| 8,046,767 B2 * | 10/2011 | Rolia et al. | 718/104 |
| 8,260,840 B1 * | 9/2012 | Sirota et al. | 709/201 |
| 8,457,010 B2 * | 6/2013 | Lientz et al. | 370/252 |
| 2002/0029285 A1 * | 3/2002 | Collins | 709/232 |
| 2004/0205110 A1 * | 10/2004 | Hinshaw | 709/201 |
| 2004/0243547 A1 * | 12/2004 | Chhatrapati et al. | 707/2 |
| 2005/0033596 A1 * | 2/2005 | Tummolo | 705/1 |
| 2006/0026179 A1 * | 2/2006 | Brown | G06F 17/30306 |
| 2007/0100793 A1 * | 5/2007 | Brown | G06F 17/30557 |
| 2007/0271242 A1 * | 11/2007 | Lindblad | 707/3 |
| 2008/0221941 A1 * | 9/2008 | Cherkasova et al. | 705/7 |
| 2009/0132536 A1 * | 5/2009 | Brown | G06F 17/3056 |
| 2009/0327216 A1 * | 12/2009 | Brown et al. | 707/2 |
| 2009/0328050 A1 * | 12/2009 | Liu et al. | 718/104 |
| 2010/0162251 A1 * | 6/2010 | Richards | G06F 17/30442 |
| | | | 718/102 |
| 2010/0250748 A1 * | 9/2010 | Sivasubramanian et al. | 709/226 |

* cited by examiner

*Primary Examiner* — Susan Chen
(74) *Attorney, Agent, or Firm* — Ramin Mahboubian

(57) ABSTRACT

Excess capacity available to a database system in a capacity controlled environment can be effectively managed. In particular, excess capacity that is not made available for normal operations of a database system can be used to manage errors, especially situations that may hinder expected performance of the database system. In addition, excess capacity can be used to optimize or further optimize database queries, especially those that meet a criterion (e.g., not fully optimize, not optimized as expected).

19 Claims, 20 Drawing Sheets

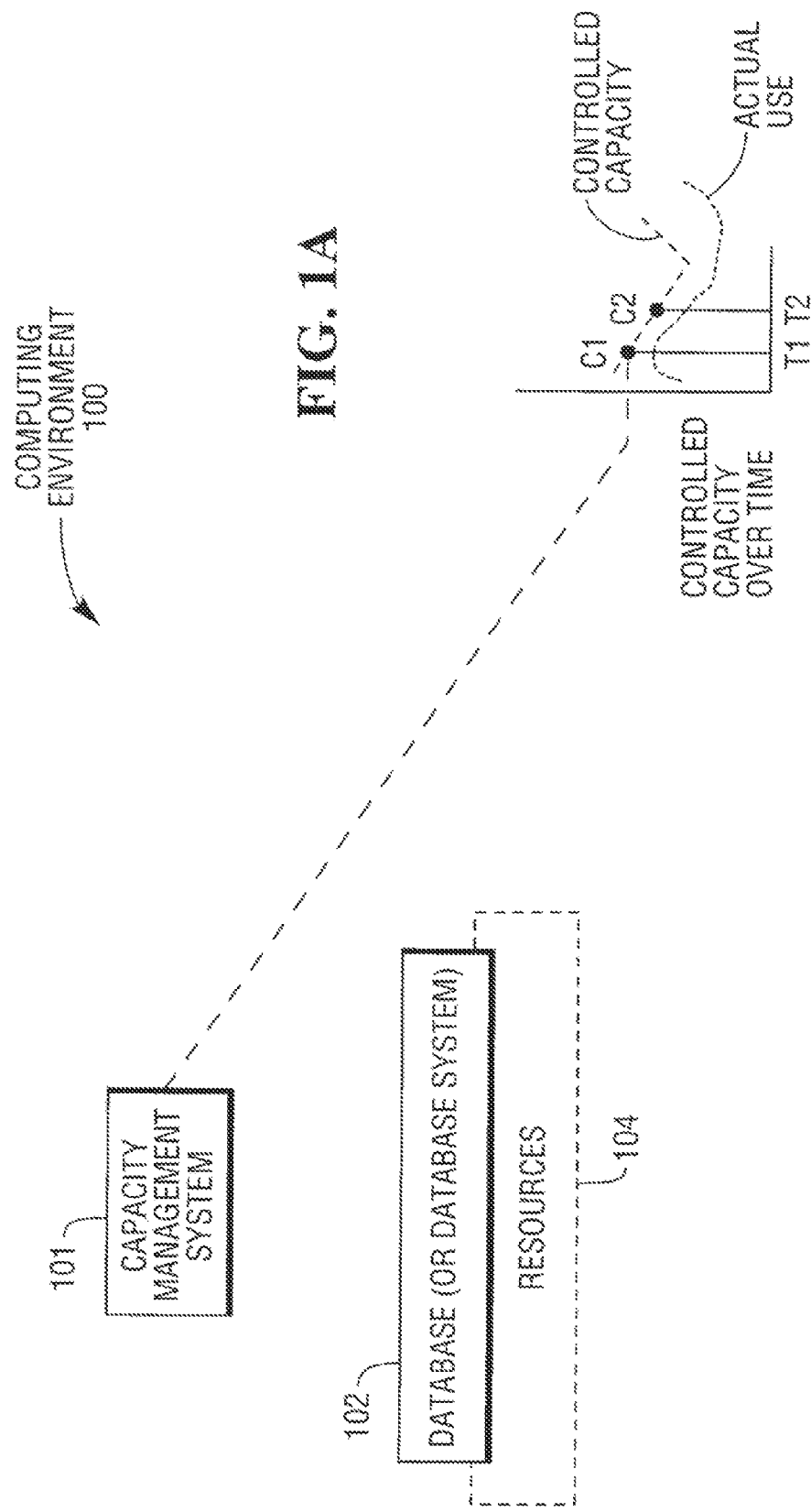

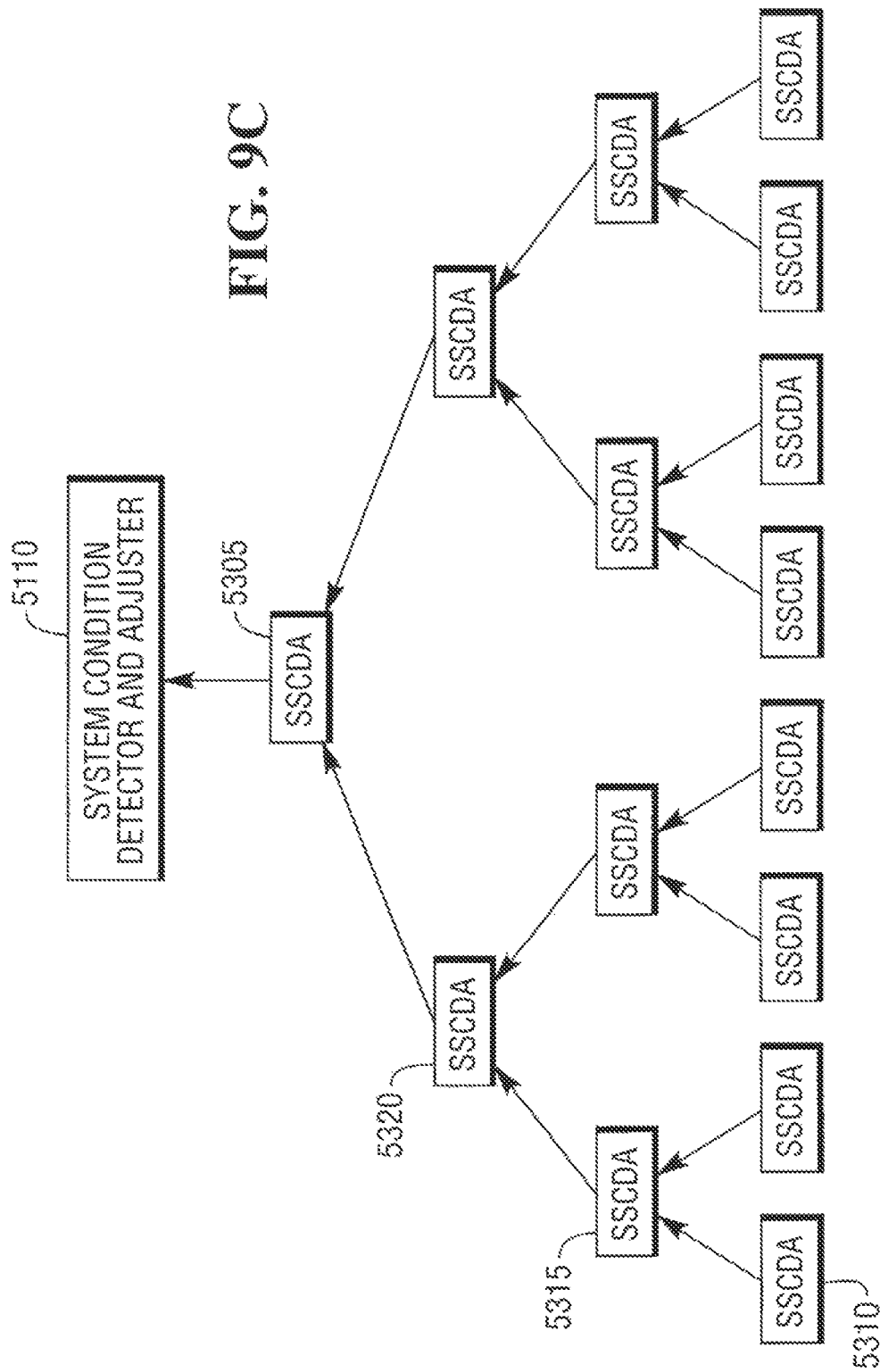

MANAGING EXCESS CAPACITY OF DATABASE SYSTEMS IN A CAPACITY CONTROLLED COMPUTING ENVIRONMENT

BACKGROUND

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have been evolved over the years and some databases that are for various business and organizations (e.g., banks, retail stores, governmental agencies, universities) in use today can be very complex and support several users simultaneously by providing very complex queries (e.g., give me the name of all customers under the age of thirty five (35) in Ohio that have bought all items in a list of items in the past month in Ohio and also have bought ticket for a baseball game in San Diego and purchased a baseball in the past 10 years).

Typically, a Database Management System (DBMS) is provided for relatively large and/or complex database. As known in the art, a DBMS can effectively manage the database or data stored in a database, and serve as an interface for the users of the database. A DBMS can be provided as an executable computer program (or software) product as also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity. In either case, however, there is a need for a flexible database environment that can adjust better to the needs of it users and also allow the capacity of the database to change as the need of its users change.

In view of the foregoing, techniques for controlling the capacity for computing environments or systems that include a database are needed.

SUMMARY

Broadly speaking, the invention relates to computing systems and computing environments. More particularly, the invention pertains to techniques for managing the excess capacity of database or database system in a capacity controlled computing environment.

In accordance with aspect of the invention, excess capacity available to a database system in a capacity controlled environment can be effectively managed. In particular, excess capacity that is not made available for normal operations of a database system can be used to manage errors, especially situations that may hinder expected performance of the database system. By way of example, database queries that take longer than expected to complete due to a potential system error can be executed using excess capacity. In addition, excess capacity can be used to optimize or further optimize database queries, especially those that meet a criterion (e.g., not fully optimize, not optimized as expected).

The invention can be implemented in numerous ways, including, for example, a method, an apparatus, a computer readable medium, a database system, and a computing system (e.g., a computing device). A computer readable medium can, for example, include at least executable computer program code stored in a tangible or non-transient form. Several embodiments of the invention are discussed below.

In accordance with one embodiment of the invention, in a computing environment, a database system can effectively manage excess capacity and make it available for processing one or more operations including operations pertaining to processing one or more database queries and/or operation pertaining to optimization or further optimization of database one or more database queries.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1A depicts a computing environment including a capacity management system provided for a database (or a database system) in accordance with one embodiment of the invention.

FIG. 9C depicts an arrangement for handling inputs and outputs to and from a SCDA in accordance with one embodiment of the invention.

DETAILED DESCRIPTION

Figure 1B:
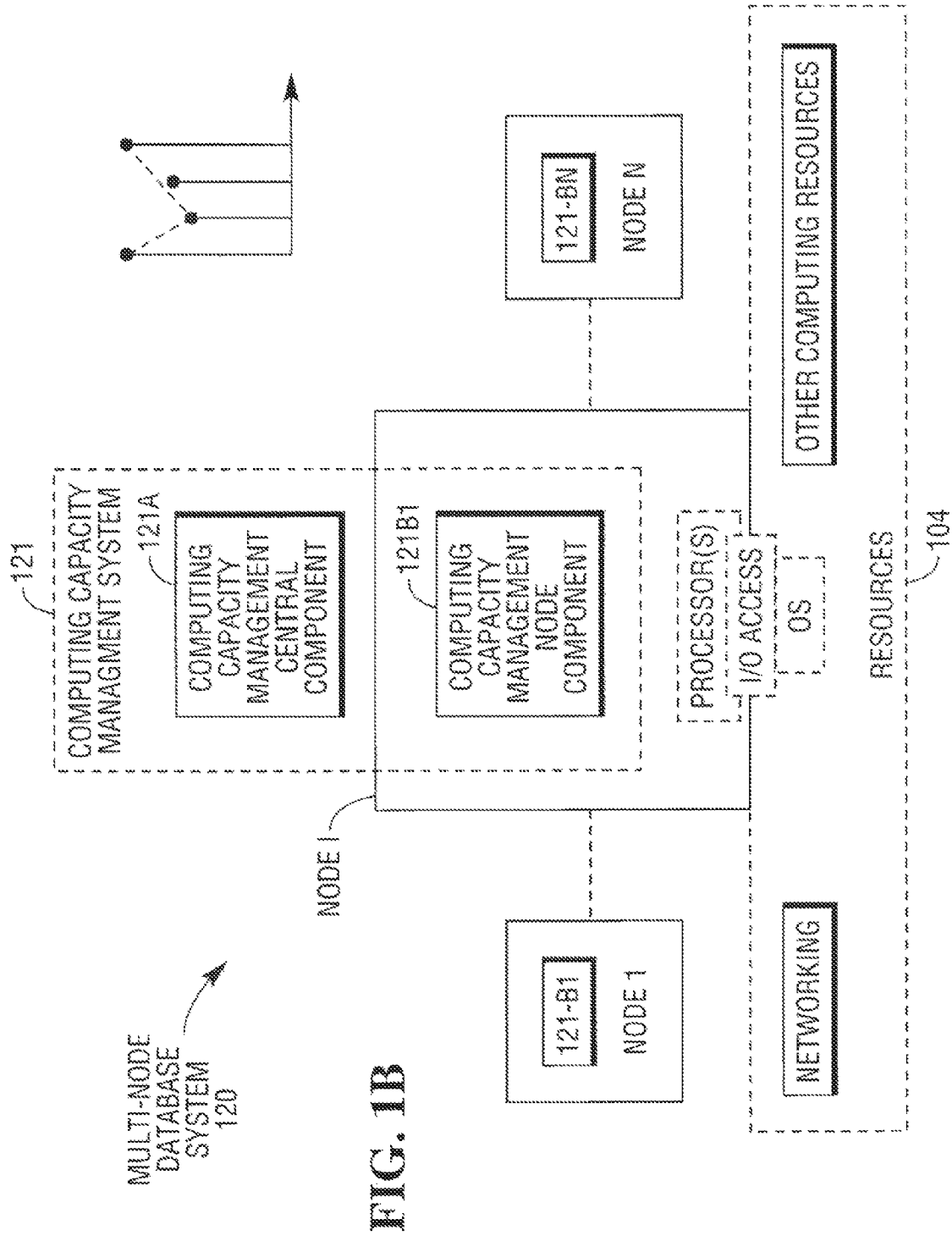
FIG. 1B depicts a multi-node database system, including a computing capacity management system in accordance with one embodiment of the invention.

As noted in the background section, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity. In either case, however, there is a need for a flexible database environment that can adjust better to the needs of it users and also allow the capacity of the database to change as the need of its users change.

Accordingly, techniques for controlling the capacity for computing environments or systems that include a database are needed. In particular, controlling the capacity of database systems would be very useful, especially given the prevalence of the database in various aspects of business and life in the world today.

Furthermore, it is likely that the use of databases will still continue to grow rapidly to serve an even wider range of entities with widely differing needs and requirements. Hence, it would be useful to control the capacity of computing environments or systems that include a database. In particular, it would be very useful to allow the capacity of a database to change as desired or needed. In other words, it would be very useful to provide a database system that can change its capacity or ability to perform various database related tasks, activities, etc. (or "database work"). For example, the ability to rapidly upgrade hardware resources (e.g., number of database nodes and their corresponding processors) in what may be budget-friendly increments to customers or purchasers of a database is highly desirable and useful. It would also be useful to provide capacity controlled environment for a database system capacity to, for example provide capacity to users, customers and/or purchasers of database as desired or needed (e.g., providing Capacity on Demand (COD)). It would also be useful to manage the excess capacity (e.g., the capacity not configured for use or regular use by a database system).

Accordingly, techniques for managing the excess capacity of database or database system in a capacity controlled computing environment are disclosed.

In accordance with aspect of the invention, excess capacity available to a database system in a capacity controlled environment can be effectively managed. In particular, excess capacity that is not made available for normal operations of a database system can be used to manage errors, especially situations that may hinder expected performance of the database system. By way of example, database queries that take longer than expected to complete due to a potential system error can be executed using excess capacity. In addition, excess capacity can be used to optimize or further optimize database queries, especially those that meet a criterion (e.g., not fully optimize, not optimized as expected).

In accordance with one embodiment of the invention, in a computing environment, a database system can effectively manage excess capacity and make it available for processing one or more operations including operations pertaining to processing one or more database queries and/or operation pertaining to optimization or further optimization of database one or more database queries.

Embodiments of these aspects of the invention are also discussed below with reference to FIGS. 1A-16. However, those skilled in the art will readily appreciate that the detailed description given herein with respect to these figures is for explanatory purposes as the invention extends beyond these limited embodiments.

FIG. 1A depicts a computing environment 100 including a capacity management system 101 provided for a database (or a database system) 102 in accordance with one embodiment of the invention. Although not shown in FIG. 1A, it should be noted that the database or database system 102 can also include a Data Base Management System (DBMS). Those skilled in the art will readily appreciate that the capacity management system 101 can be provided by hardware and/or software. For example, the capacity management system 101 can be provided as executable code stored on a computer storage medium (not shown) that can be read and executed by one or more processors (not shown).

As will be described in more detail below, the capacity management system 101 can control the capacity of the database 102. As such, the capacity management system 101 can, for example, be operable to change, vary, and/or maintain the capacity of the database 102 in a controlled manner. Although depicted as a component separate from the database 102, it should be noted that the capacity management system 101 may partially or entirely be implemented as a part of the database (or database system) 102 as will be appreciated and readily understood by those skilled in the art. In particular, it will be appreciated that the capacity management system 101 can be provided at least in part in or by a DBMS (not shown in FIG. 1A).

Referring to FIG. 1A, generally, capacity management system 101 can use one or more resources 104 in order to process data or requests associated with the database 102. The resources 104 can, for example include processors, memory, access to various services and functions (e.g., Input and Output (I/O) operations, including reading and writing of the data to and from the database 102).

As will be appreciated by those skilled in the art, the resources 104 may be a part of the database 102 or be a part of a larger computing environment or system, namely the computing environment 100. Also, the database 102 can include one or more database nodes, each including one or more processors operable to process data which is typically stored in a computer readable storage medium (e.g., a hard disk). It should be noted that the processor(s) and the computer readable storage medium of a database node may be a part of the resources 104.

The database 102 may, for example, be a conventional database operable to perform conventional functions. As such, the database 102 can be a database system with multiple database nodes. In other words, the database 102 can include multiple database nodes (Node 1 to Node N) where a database node (Node I) can access one or more resources 104 (e.g., processors, volatile memory, persistent memory, persistent storage, Input/output (I/O) operations, communication or networking capabilities, Operating System (OS)).

As a multi-node database, each one of the database nodes 1-N can operate and process data independently but in a coordinated manner, which may allow the database nodes to communicate with a central entity (e.g., a database managing component) and/or directly or indirectly with each other. A multi-node database system is described further below with reference to FIG. 1B in accordance with one embodiment of the invention.

However, referring back to FIG. 1A, generally, the database 102 or one or more database nodes of the database 102 can access one or more resources 104 in the computing environment 100 to perform one or more tasks and/or to process data. As known in the art, generally, a resource 104 can be a physical or virtual component and may be used to perform or to facilitate performing a task or a computing task (e.g., processing or manipulating data, reading or writing data, communicating data to an internal or external component). As such, a resource 104 may be a physical resource. For example, one or more internal physical components of the database 102, or one or more devices connected to the database 102 can be computing resource 104 in the computing environment 100. A resource 104 may also be a virtual resource. For example, various files, network connections and memory areas can be virtual resources 104 that may be available to the database 102. As such, a resource 104 can, for example, include resources or computing resources often used to perform computing tasks (e.g., one or more general purpose or specialized processors, memory, access to I/O operations to read and write data) as well as various other resources (e.g., hard disk space, Random Access Memory (RAM), cache memory, and virtual memory, network throughput, electrical power, external devices, external devices).

Generally, a database or database system 102 can be provided by or as a system or computing system with an associated level of capacity, including computing capacity which can be representative of its potential to perform tasks. By way of example, for a relatively simple Personal Computer (PC), the computing capacity of the PC can be closely related to the clock cycle of its processor or as more commonly known its processing power or speed (e.g., one (1) Giga Hertz (GHZ)). However, more accurately, the computing capacity of a computing system can be closely related to all of the resources available to the computing system, including but not limited to its processor(s), memory, ability to perform I/O functions, its networking capabilities, storage space). As such, the computing capacity of the database 102 can be closely related to virtually all of the resources 104 available to it in the computing environment 100. It should also be noted that capacity of the database 102 does not necessary reflect its actual or current level of usage. Rather, the capacity of the database 102 is generally related to a maximum level of usage that can be accommodated by the resources 104.

To further elaborate, consider when that database 102 is provided as a computing system. In that case, when the capacity of the computing system is at full capacity or one hundred (100) percent, the computing system can be operable up to its maximum potential capacity. This does not, however, mean that the computing system has to operate or ever reach its capacity or maximum potential. As such, a computing system may, for example, be operating at seventy five (75) percent capacity even though it is operable at full capacity or one hundred (100) percent capacity when it is determined to reduce its capacity from full capacity to one half (or 50 percent). However, in the example, when the capacity is reduced from full capacity to half or fifty (50) percent, the computing system can no longer operate at 75% percent of its full capacity (i.e., the level it was operating before its capacity was reduced from).

To further elaborate, FIG. 1A depicts the controlled capacity of the database 102 and the actual usage of the capacity (i.e., actual usage of resources 104 by the database system 102) over time. As such, the capacity of the database 102 can be a cap placed on the extent of usage of the resources 104. In other words, the capacity of the computing environment 100 and/or database 102 can be controlled by controlling the extent in which the resources 104 are made available in accordance with one aspect of the invention. Moreover, it will be appreciated that the capacity management system 101 can control the capacity of the database 102 so as to change or vary the capacity over time in a controlled manner in accordance with another aspect of the invention. This means that the capacity management system 101 can effectively change the capacity of the database system 102 from a first capacity (C1) at a time T1 to a second capacity (C2) at time T2, which is different than the first capacity (C1). In other words, the capacity of the database system can be changed or varied at runtime or execution time in a dynamic manner.

As depicted in FIG. 1A, the computing capacity of the computing environment 100 and/or database system 102 can be varied over time. Moreover, the capacity management system 101 can achieve this variation of the computing capacity in a controlled manner, where the current computing capacity may be increased or decreased as desired and/or needed. This means that the capacity of the database 102 and/or computing environment 100 can be controlled on demand to provide Capacity On-Demand, or Capacity on Demand (COD).

As will be described in greater detail, the capacity management system 101 can use various techniques in order to effectively change the capacity of the database 102. By way of example, the capacity management system 101 can be operable to change the effective processing speed (or maximum processing speed) of one or more processors provided as, or among, the resources 104. In addition, or alternatively, the capacity management system 101 can, for example, be operable to change the effective rate in which the processors operate (e.g., by skipping one or more clock cycles). As another example, access or execution time of one or more processors provided as or among the resources 104, as well as other various other resources 104 (e.g., access to I/O operations) can be delayed. In addition, the time, rate and/or duration of access to a resource 104 can be controlled to effectively monitor and limit the extent of access to the resource 104. Techniques for changing the capacity of the database system 102 are discussed in greater detail below.

By in large, the computing capacity of a computing system, which may be more directly related to its ability (e.g., performing tasks, processing data) can be a good representative of its overall or general capacity. As such, rather than controlling all the resources 104 representative of a general capacity which may include resources less directly related to performing computing tasks (e.g., hard disk capacity, power resource, network capability), controlling the computing capacity by controlling the resources that are more directly related to performing tasks and processing data can be sufficient, especially for database systems that primarily function to process data and requests pertaining to data stored in a database. Accordingly, techniques for controlling the computing capacity of database system are further discussed below in greater detail. The techniques are especially suited for computing systems that primarily function to perform computing tasks (e.g., database systems, computing systems that primarily function to process data and/or perform computing tasks).

As noted above, the database or database system 102 (depicted in FIG. 1A) can, for example, be a multi-node database system. Moreover, it will be appreciated that a capacity management system 101 can be provided to control the capacity of a multi-node database system 102. In fact, such a capacity management system can be provided as a part of a multi-node database system 102.

To further elaborate, FIG. 1B depicts a multi-node database system 120, including a computing capacity management system 121 in accordance with one embodiment of the invention. It will be appreciated that the computing capacity management system 121 can be operable to change the computing capacity of multiple database nodes (Nodes 1-N) of the database system 120 at execution time in a controlled and dynamic manner. This means that the computing capacity management system 121 can effectively control the computing capacity of the multi-node database system 120 by effectively controlling the computing capacity of one or more (or all) of the database nodes 1-N when data is being processed by one or more database nodes 1-N of the multi-node database system (e.g., when database queries are being processed). In other words, capacity management system 121 can effectively control the extent of access to resources 104 by one or more (or all) of the database nodes 1-N of the multi-node database system 120.

It should be noted that the computing capacity management system 121 can, for example, depict in greater detail components that can be provided for the capacity management system 101 shown in FIG. 1A. Specifically, the capacity management system 121 can include a central component 121A and a node component 121B in accordance with the embodiment depicted in FIG. 1B. The central component 121A of the computing capacity management system 121 can be operable to effectively control the computing capacity of the database system as whole and/or coordinate or manage the capacity control activities as performed locally at one or more database nodes 1 to Node N. In contrast, a node component 121B can primarily control and/or monitor the computing capacity of a particular database node (i.e., a node I) without controlling or having knowledge about the manner in which the capacity of any other database nodes, or the capacity of the multi-node database system 120 as a whole, is being controlled.

Generally, the computing capacity management system 121 of the multi-node database system 120 can be operable to obtain (e.g., receive, determine) an overall target capacity for the multi-node database system 120 and effectively set and/or change the computing capacity of the multi-node database system 120 to the overall target capacity. As described in greater detail below, the computing capacity management system 121 can also be operable to maintain the overall capacity for the multi-node database system 120 at an overall target or desired computing capacity. By way of example, the central component 121A may obtain an overall target capacity for the multi-node database system 120, and based on the overall target capacity, determine an individual target capacity for a particular database node. Accordingly, the central component 121A can, for example, be operable to communicate the determined individual target capacity of a particular database node (Node I) to its respective node component 121-BI. The node component 121-BI can, in turn, set and/or maintain the computing capacity of the database node I to the determined individual target capacity as communicated by the central component 121A. Other database nodes can operate in a similar manner to set and maintain their node capacity at a target capacity. As a result the overall target computing capacity for the database system can be achieved.

For example, a target overall computing capacity which is half (or 50 percent) of the full computing capacity can be received as input by the computing capacity management system 121 as a target computing capacity for the database 120. In the example, the central component 121A may determine to change the computing capacity of each one of the database nodes (Node 1-Node N) from their current capacity, which may be at full computing capacity to half computing capacity. As such, central component 121A may be operable to communicate with all of the node components (121B1-121-BN) to effectively cause them to change their capacities from full to half computing capacity.

Alternatively, central component 121A may determine to set the capacities of the individual database nodes (Node 1-Node N) to various levels individually to achieve the desired overall target capacity. As such, central component 121A may cause the capacity of a first database node to be changed form full to half capacity, while the computing capacity of a second database node may be increased from twenty five (25) percent to fifty (50) percent, the computing capacity of a third database node may be set to seventy (70) percent computing capacity, the computing capacity of a third database node may be set to thirty (30) percent computing, and so on, in order to achieve a desired overall capacity, namely, half or fifty (50) percent overall capacity for the multi-node database system 120.

As another example, if one or more database nodes of the multi-node database system 120 fail, the capacity of the database nodes that are still operable can be adjusted to compensate for the loss of one or more nodes in order to still achieve an overall capacity for a database. In the example, the capacity of the database nodes can be readjusted when all database nodes become operable again.

Figure 1C:
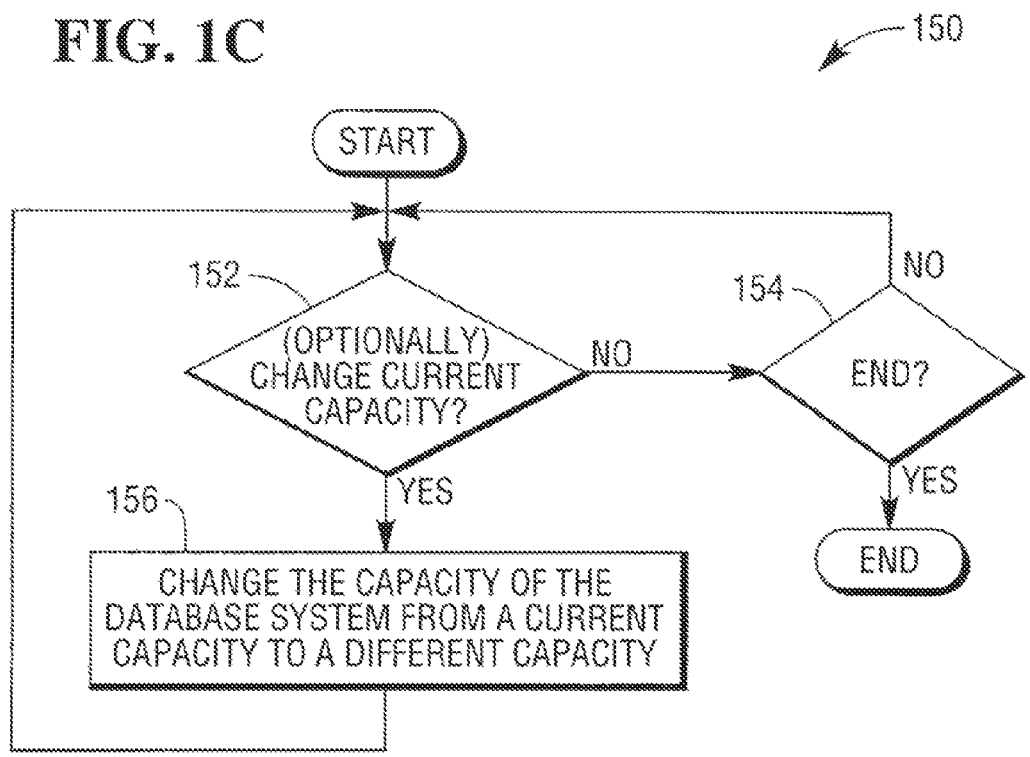
FIG. 1C depicts a method for controlling capacity of a database system in accordance with one embodiment of the invention.

To further elaborate, FIG. 1C depicts a method 150 for controlling capacity of a database system in accordance with one embodiment of the invention. Method 150 can, for example, be performed by the capacity management system 101 (shown in FIG. 1A) or the computing capacity management system 121 (shown in FIG. 1B).

Referring to FIG. 1C, optionally, it can be determined (152) whether to change the capacity of a database system from its current capacity. As those skilled in the art will readily appreciate, the determination (152) can, for example, represent a design or programming choice and/or can be made based on input and/or one or more criteria (e.g., determining a need to change the capacity to handle a high priority request or performing system upgrade, receiving a target capacity as input, receiving a command to change the capacity). In effect, method 150 can wait for a determination (152) to change the capacity of the database system unless it is determined (154) to end the method 150. As such, the method 150 can, for example, end as a result of receiving input, system shutdown, etc. However, if it is determined (152) to change the capacity of the database system, the capacity of the database system can be changed (156) from it current capacity to a different capacity. The capacity of the database system can, for example, be changed by causing the usage capacity of at least one of the resources to be changed from a current usage capacity to a different usage capacity. Thereafter, method 150 can proceed to determine whether to change the capacity of the database system in a similar manner as noted above. Method 500 can end if it is determined (154) to end it.

As noted above, a capacity management system (e.g., capacity management system 101 depicted in FIG. 1A, computing capacity management system 121 depicted in FIG. 1B) can be operable to change or vary the capacity of the database system at execution time or runtime, in a dynamic manner in accordance with aspect of the invention.

Figure 2:
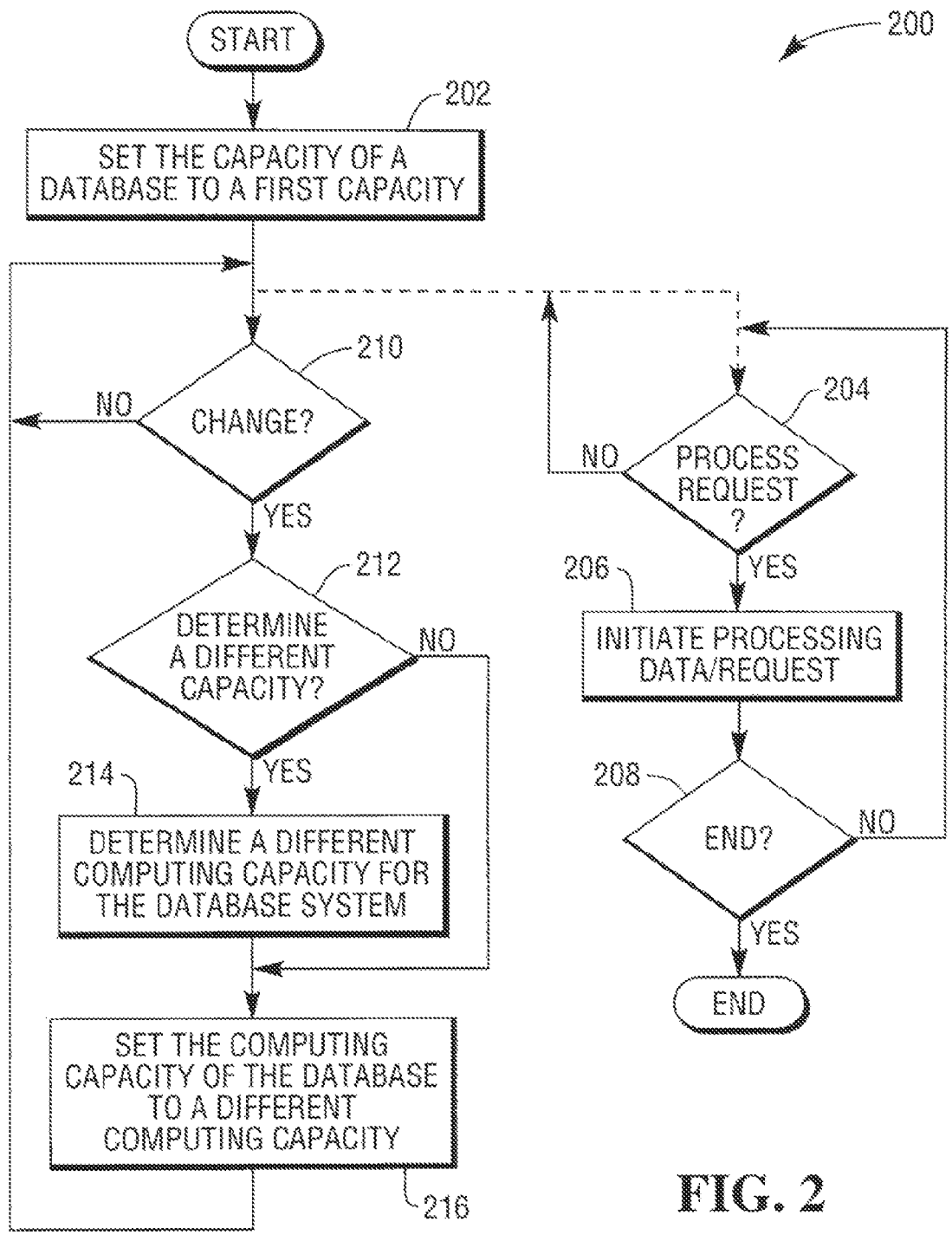
FIG. 2 depicts a method for processing data by a database (or database system) in accordance with one embodiment of the invention.

To further elaborate, FIG. 2 depicts a method 200 for processing data by a database (or database system) in accordance with one embodiment of the invention. Method 200 can, for example, be performed by the capacity management system 101 (shown in FIG. 1A) or the computing capacity management system 121 (shown in FIG. 1B).

Referring to FIG. 2, initially, the computing capacity of a database is set (202) to a first capacity (e.g., a first computing capacity). As noted above, the capacity of a database can, for example, be set to a particular value by setting (e.g., changing, adjusting, limiting) the usage capacity of one or more resources (e.g., processors, access to I/O operations) associated with the database. Next, the database can process data and various database operations can be performed. In other words, conventional database operations can be performed. Specifically, it can be determined (204) whether a database request or query has been received. Accordingly, processing of a database request can be initiated (206). In effect, method 200 can continue to process data and perform database operations unless it is determined (208) to end processing of the data and the performing database operations. The database operations can, for example, end as a result of a system shutdown or receiving authorized input. As such, the method 200 can end if it is determined (208) to end the processing of data and performing database operations.

However, it should be noted that while the data is being processed and/or database operations are being performed by the database, it can be determined (210) whether to change the capacity of the database. The determination (210) can, for example, be made based on input indicative of change, or based on one or more criteria (e.g., one or more system conditions, periodic adjustments, need to meet service goals). If it is determined (210) to change the capacity of the database, it can also be determined (212) whether to determine a capacity (i.e. different or new capacity) for the database.

It should be noted that a different capacity can be received as input so there may not be a need to determine (214) a capacity for the database. However, if it is determined (212) to determine a capacity for the database, a capacity which is different than the first capacity can be determined (214) for the database. It will be appreciated by those skilled in the art, a capacity for the database can be determined based on one or more criteria (e.g., the extent in which excess capacity is needed to perform maintenance, periodic adjustment, past usage and/or anticipated usage, amount of money paid for capacity).

In any case, if it determined (210) to change the capacity of the database from the first capacity to a different capacity, regardless of whether a capacity is determined (212) or not, the capacity of the database is set (214) to a second capacity, different than the first capacity (i.e., higher or lower than the first capacity). The capacity of the database can be set to the second capacity, for example, by affecting the usage capacity of one or more resources associated with the database (i.e., by effectively increasing or decreasing the usage capacity or extent of allowed usage of one or more resources associated with the database).

After, the capacity of the database has been effectively changed by setting (214) the capacity to a second capacity, the method 200 can proceed determine (210) whether to change the capacity of the database. As result, the capacity of the database can be changed (216) in a dynamic manner at runtime or execution time, while the data is being processed and database operations are being performed by the database (i.e., the database is operational and/or active) in a similar manner as discussed above. Method 200 ends if it determined (208) to the end the processing of data and database operations.

As noted above, it can be determined whether to change the current capacity of a database (or database system) based on input indicative of change, or one or more criteria (e.g., one or more system conditions, periodic adjustments, need to meet service goals). By way of example, it can be determined to extend or increase the current capacity of a database in order to meet a system requirement (e.g., a Service Level Agreement (SLA) requiring high priority database queries to be processed within a determined time period, system maintenance or update). As such, it can, for example, be determined to allow excess capacity beyond a target capacity (e.g., fifty (50) percent) in order to meet an SLA or to allow a system update. It should also be noted that excess system capacity can also be measured and accounted (e.g., billed) in accordance with one aspect of the invention.

Figure 3:
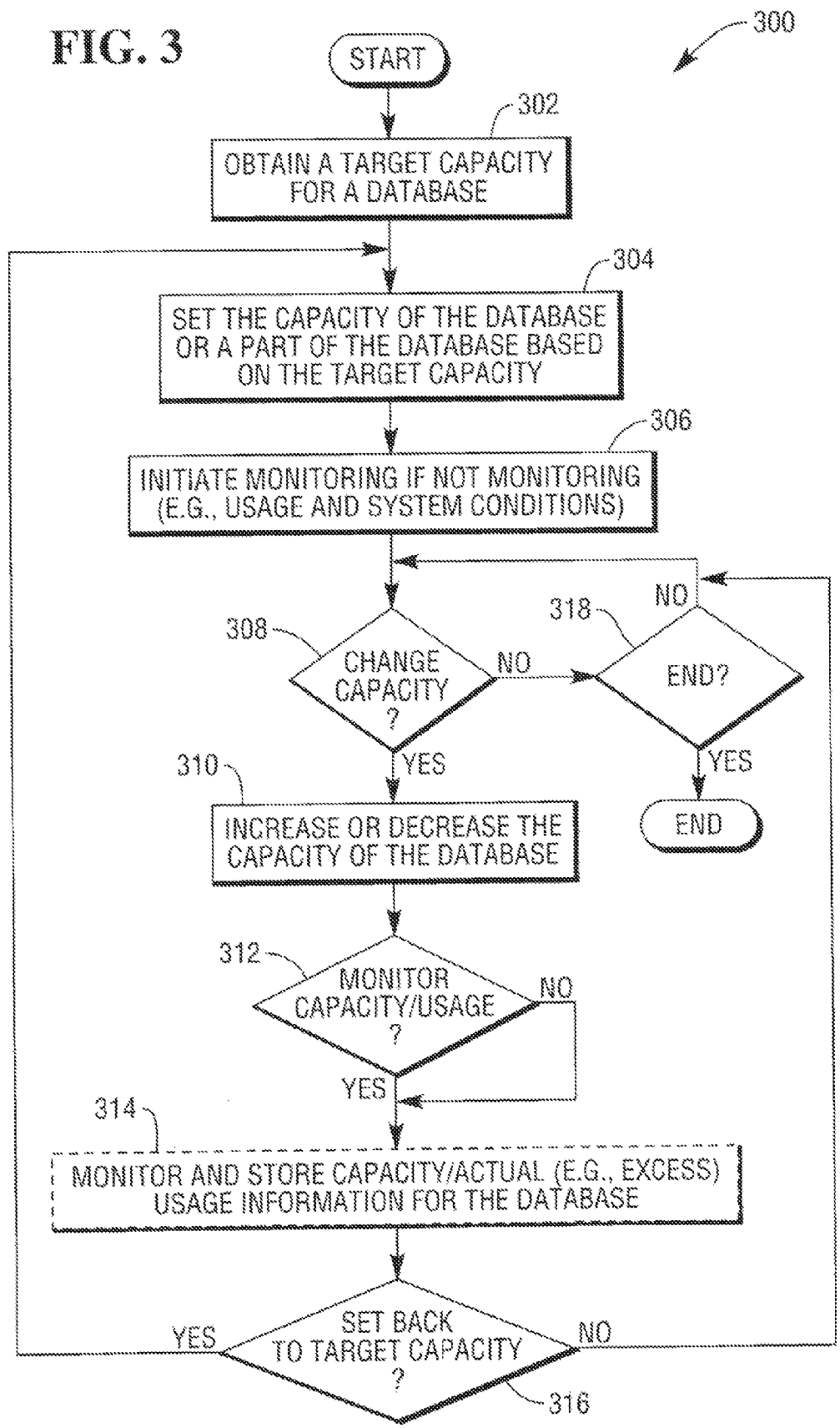
FIG. 3 depicts a method for controlling the capacity of a database (or a database system) in accordance with another embodiment of the invention.

To further elaborate, FIG. 3 depicts a method 300 for controlling the capacity of a database (or a database system) in accordance with another embodiment of the invention. Method 300 can, for example, be performed by the capacity management system 101 (shown in FIG. 1A) or the computing capacity management system 121 (shown in FIG. 1B).

Referring to FIG. 3, initially, a target capacity for the database can be obtained (302). The target capacity can, for example, be received as input or determined based on one or more criteria (e.g., capacity selected and/or paid for by a user and/or customer of a database, types and/or number of database requests currently pending). It should be noted that the target database capacity can, for example, be representative of an overall target capacity for a database or a database system (e.g., a multi-node database system), or a specific target capacity for one or more database nodes of a multimode database). After the target capacity of the database is obtained (302), the capacity of the database or a portion of the database (e.g., one or more database nodes of a multimode database) can be set (304) to the target system capacity.

As will be described in greater details below, the capacity of at least a part of the database can be set (304) based on a target capacity by using one or a combination of various techniques. By way of example, one or more database tasks or activities can be regulated with respect to the access to one or more resources of the database based on the target capacity. In other words, the extent to which one or more database tasks or activities can access one or more resources of the database (e.g., access to processor for execution time, access to I/O operations) can be controlled based on a target capacity in order to effectively set the capacity of at least a portion of the database to the target capacity. As another example, the effective processing rate and/or clock rate of one or more processors of the database can be set based on the target capacity.

In any case, in addition to setting the capacity of at least a portion of the database based on the target capacity, monitoring can be initiated (306) if it has not been initiated already. This monitoring can, for example, include monitoring the usage of one or more resources and/or one or more system conditions (e.g., monitoring execution of one or more database tasks and resources consumed by them, monitoring for conditions that are programmed to trigger change in the capacity of the database).

After the monitoring has been initiated (306) it is determined (308) whether to change the capacity of at least a portion of the database from its current capacity (e.g., whether to change the capacity of a database from a target capacity under which the database is configured to operate under normal circumstances). It should be noted that the determination (308) can be made based on the monitoring data obtained as a result of the monitoring that has been initiated (306) and after at least a portion of the database has been set (304) or configured to operate at a target capacity.

By way of example, monitoring (306) of one or more system conditions can indicate a need to increase the capacity. As such, it can be determined (308) to allow the database to exceed its target capacity at least for a period of time. Generally, if it is determined (308) to change the capacity of at least a portion of the database, the capacity of at least one portion of the database can be increased or decreased (310). By way of example, the overall capacity of a multi-node database system can be increased from its target capacity, fifty (50) percent, to seventy five (75) percent in order to meet a need or a requirement.

It should be noted that capacity and/or actual usage can optionally be monitored and stored (e.g., measured and recorded) based on the monitoring (306) of the tasks and the resources consumed by them. As such, it can optionally be determined (312) whether to monitor (e.g., measure) the capacity and/or actual usage of the capacity provided. Consequently, the capacity and/or actual usage of the capacity of a database can be monitored and stored (314). By way of example, capacity used beyond a target capacity (or excess capacity) can be measured based on monitoring the usage of one or more resources consumed by database tasks or activities. Usage of resources in an excess of the target capacity can, for example, be billed at a cost or as an additional cost beyond the target capacity. After the capacity of at least a portion of database has changed (312) it can be determined (316) whether to set the capacity of at least a portion of the database back to the target capacity. Accordingly, the capacity of at least a portion of the database can be set (304) to the target capacity again and the method 300 can proceed in a similar manner as discussed above.

However, if it is determined (316) not to set the capacity of at least a portion of the database to the target capacity, the method 300 can proceed to determine whether to change the capacity of at least a portion of the database. In effect, method 300 can wait for a determination (308) to change the capacity of at least a portion of the database unless it is determined (318) to end the method 300, for example, based on input provided by a database administrator, or when the system is to be shut down.

More Specific Techniques for Controlling Resources of a Database

As noted above, the capacity of database can be controlled by effectively controlling the usage capacity of one or more resources associated with a database in accordance with one aspect of the invention. In particular, access to the computing resources of a database can be controlled in order to effectively control the computing capacity of a database. Typically, a task (e.g., a database query) requires access to various computing resources (e.g., access to a processor or execution time, access to I/O operations including reading data stored in a database and writing data to the database). In other words, access to resources required by a database can be effectively regulated in accordance with one aspect of the invention. It will be appreciated that a capacity management system can effectively regulate access to resources of a database in accordance with one embodiment of the invention.

Figure 4B:
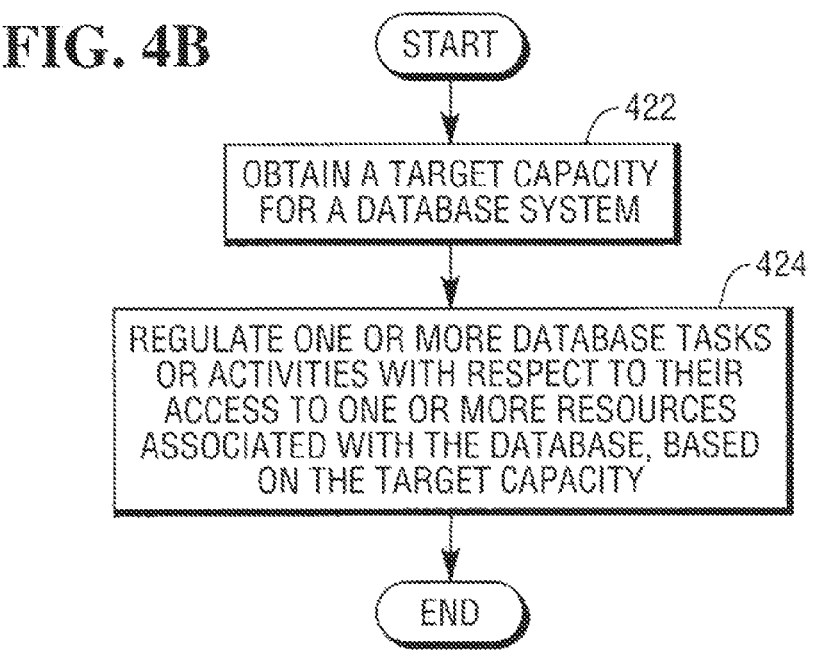
FIG. 4B depicts a method for controlling the capacity of a database in accordance with yet another embodiment of the invention.
Figure 4A:
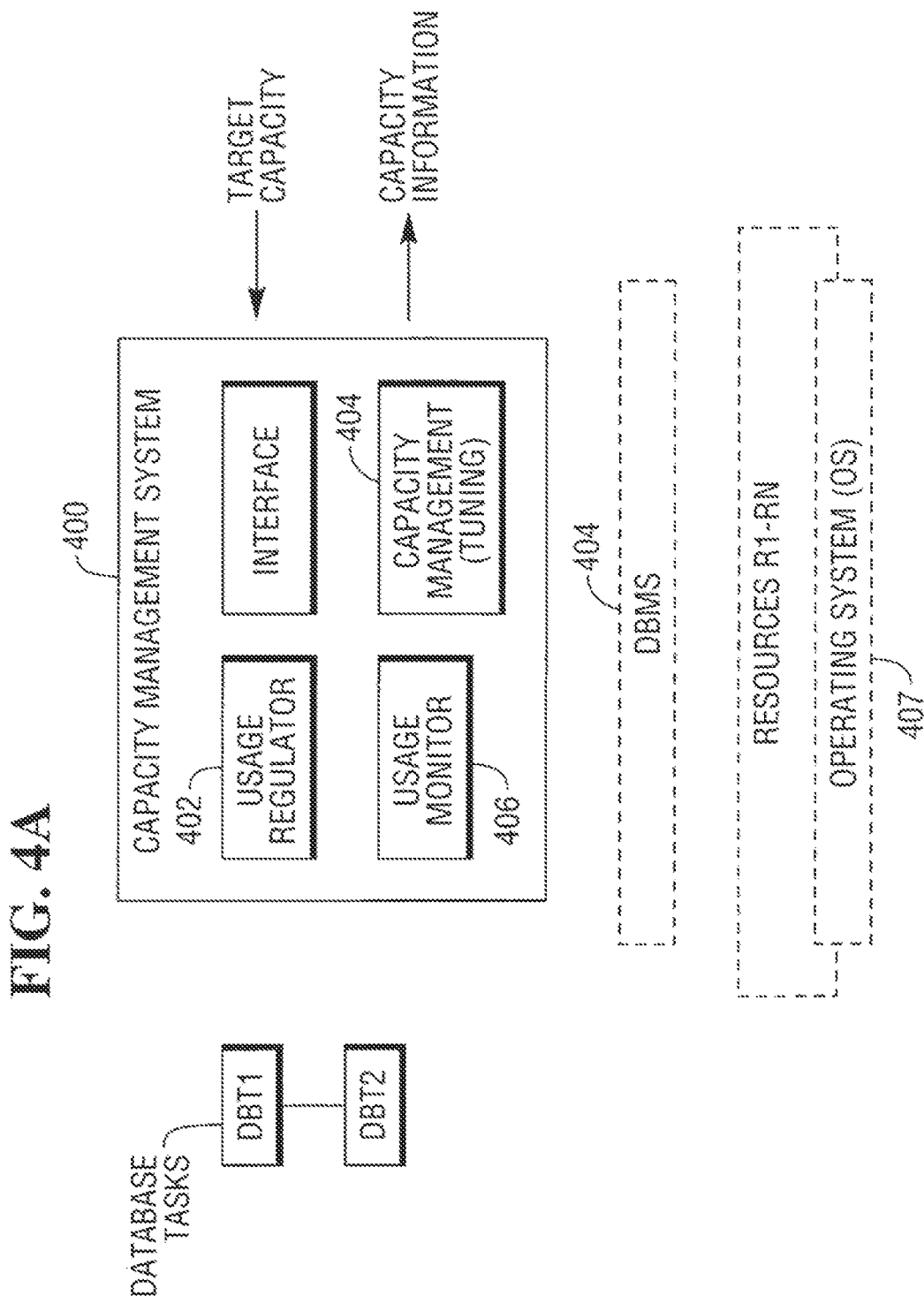
FIG. 4A depicts a capacity management system for a database in accordance with another embodiment of the invention.

To further elaborate, FIG. 4A depicts a capacity management system 400 for a database in accordance with one embodiment of the invention. The capacity management system 400 can represent in a greater detail the components that can be provided for the capacity management system 101 (shown in FIG. 1A) or the computing capacity management system 201 (shown in FIG. 1B). It should be noted that one or more components of the capacity management system 400 can, for example, be provided as central component for a multi-node database and/or can be provided as a node component for a particular database node of a multi-node database.

Referring to FIG. 4A, the capacity management system 400 can include a regulator (or a usage regulator) 402 operable to effectively regulate access to various resources R1-RN. More specifically, regulator 402 can regulate access to resources R1-RN when the database is actively processing data and requests (e.g., when queries made by one or more users of a database are being processed by the database). Data and requests can be processed by a Database Management System (DBMS) (e.g., a Relational Database Management System (RDBMS) 404. Conceptually, DBMS 404 can be provided over an Operating System (O.S.) 407. DBMS 404 can effectively request access to resources provided and/or under the control of the OS 407 which may include one or all of the resources R1-RN. Typically, resources R1-RN can include storage for storing data used by the DBMS 404, as well as one or more processors (e.g., Central Processing Units (CPUs).

As suggested by FIG. 4A, one or more of the resources R1-RN can be part of the O.S. 407. By in large, DBMS 404 and O.S. 407 can be considered to collectively make at least a significant part of a database or database system that could also include storage for storing data (not shown). Conceptually, the DBMS 404 may generate various database tasks DBT1-DBTN as data or requests are processed or database operations are being effectively managed by the DBMS 404. For example, in response to various database queries made by one or more users of the database, a number of database tasks DBT1-DBTN can be generated.

Typically, completion of a database task DBTI requires execution time and access to one or more I/O operations in order to complete. Generally, the regulator 402 can regulate the database tasks DBT1-DBTN at least with respect to access to the resources R1-RN.

The regulator 411 can, for example, include or cooperate with, a scheduler that effectively regulates or controls the amount of time a particular task DBTI is to wait before it can access a particular resource RJ and/or the amount of access time a particular task DBTI has with respect to a resource RJ when access is granted. The scheduler can effectively schedule the access time of the database tasks DBT1-DBTN with respect to the resources R1-RN based on a target capacity. As such, when the database is regulated to be at full capacity, the regulator 402 may schedule a particular task DBTI to execute as soon as possible and for as long as possible, of course, in consideration of other database tasks, especially those that may have a higher priority. However, if the capacity of the database is regulated by the regulator 402 to be at half of its full capacity, the regulator 402 may, for example, cause an additional delay (i.e., relative to delay that can be experienced at full capacity) before a particular task DBTI is executed and/or is given access, for example, to an I/O resource, such as a read or write to the database. Similarly, at half of full capacity, the regulator 402 may allow a particular task DBTI to execute for a shorter time than it would have if the database was regulated (or allowed to operate) at full capacity and/or may allow a shorter access time to I/O operations required by a particular database task DBTI. As a result, a task DBTI may, for example, take a significantly longer time (e.g., about two (2) times longer) to complete when the database is at half capacity than it would if the database was operating at full capacity.

Referring to FIG. 4A again, it should also be noted that the regulator 402 can receive input from a capacity (or capacity tuning) manager 404 which can effectively manage the capacity of the database by providing input indicative of a target or desired capacity under which the regulator 402 is to regulate access to the resources R1-RN. The capacity manager 405 can determine a target or desired capacity for the regulator 402 at least partially based on the monitoring data or information provided by a monitor 406. The monitor 406 can monitor usage of the resources R1-RN, as well as the progress of the database tasks DBT1-DBTN in order to provide the monitoring data to the capacity manager 405.

More specifically, the monitor 406 can monitor usage of the resources R1-RN by the database tasks DBT1-DBTN, at least some of which may also be effectively regulated by the regulator 402. It should be noted that the monitor 406 can also be operable to determine the overall usage of the resources R1-RN, for example, by obtaining the information from the O.S. 407. This means that the monitor 406 can be operable to monitor usage of the resources R1-RN by activities that may not be directly related to the DBMS 404 or activities that may not be directly controlled or regulated by the regulator 402 (e.g., system tasks, OS tasks, OS dump, Gateway, applications outside the database system, Network applications, such as TCP/IP, CLI, MTDP, MOSI). Thus, the monitor 406 can determine the usage of the resources R1-RN by the database tasks DBT1-DBTN, as well as the overall usage of the resources R1-RN, which also includes usage by tasks or activities other than the database tasks DBT1-DBTN (e.g., non-database tasks). As such, the monitor 406 can provide the regulator 402 and/or the capacity manager 405 with resource usage information indicative of the extent of usage of the resources R1-RN by each or all of the database tasks DBT1-DBTN, as well as the extent of total usage of the resources R1-RN by all tasks and activities, including those that may not be directly related to the DBMS 404 and/or controllable by the regulator 402.

In addition, monitor 406 can monitor the progress of a database task DBTI and/or estimate time required to complete a database DBTI task. The monitoring data provided by the monitor 406 can affect the regulation activities of the regulator 402, either directly or indirectly, via the capacity manager 405.

Referring to FIG. 4A yet again, it should also be noted that an interface 410 (e.g., a User Interface (UI), a Graphical User Interface (GUI)) may be optionally provided by or for the capacity management system 400. The interface 410 can be operable to receive input (e.g., a target capacity) and provide output (e.g., current over all system capacity, system capacity of an individual database node, general or overall resource usage information, overall resource usage information pertaining to database tasks or activities, one or more specific resource usage information pertaining to one or more database tasks).

To further elaborate, FIG. 4B depicts a method 420 for controlling the capacity of a database in accordance with yet another embodiment of the invention. Method 420 can, for example, be performed by the capacity management system 400 depicted in FIG. 4A.

Referring to FIG. 4B, initially, a target capacity for a database is obtained (422). The target capacity can, for example, be received as input or determined based on one or more criteria (e.g., capacity selected and/or paid for by a user and/or customer of the database, types and/or quantity of data requests currently pending). It should be noted that the target database capacity can, for example, be representative of an overall target capacity for a database or a database system (e.g., a multi-node database), or a target capacity for one or more particular database nodes of a multimode database).

Next, based on the target capacity, one or more database tasks or activities (e.g., one or more database queries, I/O operations) are regulated (424) with respect to their access to one or more resources associated with the database (e.g., access to a processor or execution time, access to a read or write operation). By way of example, a target capacity of half of full capacity can result in causing a determined delay in execution of some or all of the queries currently pending, as well as any additional queries received later after the capacity is set or regulated to be half of its full capacity. This delay can, for example, be made in direct proportion to the target capacity and can be significantly longer than the delay that would be experienced when the database is regulated at the full capacity. It will be appreciated that the delay can, for example, be caused by scheduling the database activities based on the target capacity, as will be described in greater detail below.

Referring back to FIG. 4B, method 420 ends after one or more database tasks or activities are regulated (424) with respect to their access to one or more resources associated with the database based on the target capacity.

As noted above, a scheduling technique can be used to cause delays in processing of the data and/or performing tasks by a database. The delays can be made in proportion to a target or desired capacity for the database in accordance with one aspect of the invention.

Figure 4C:
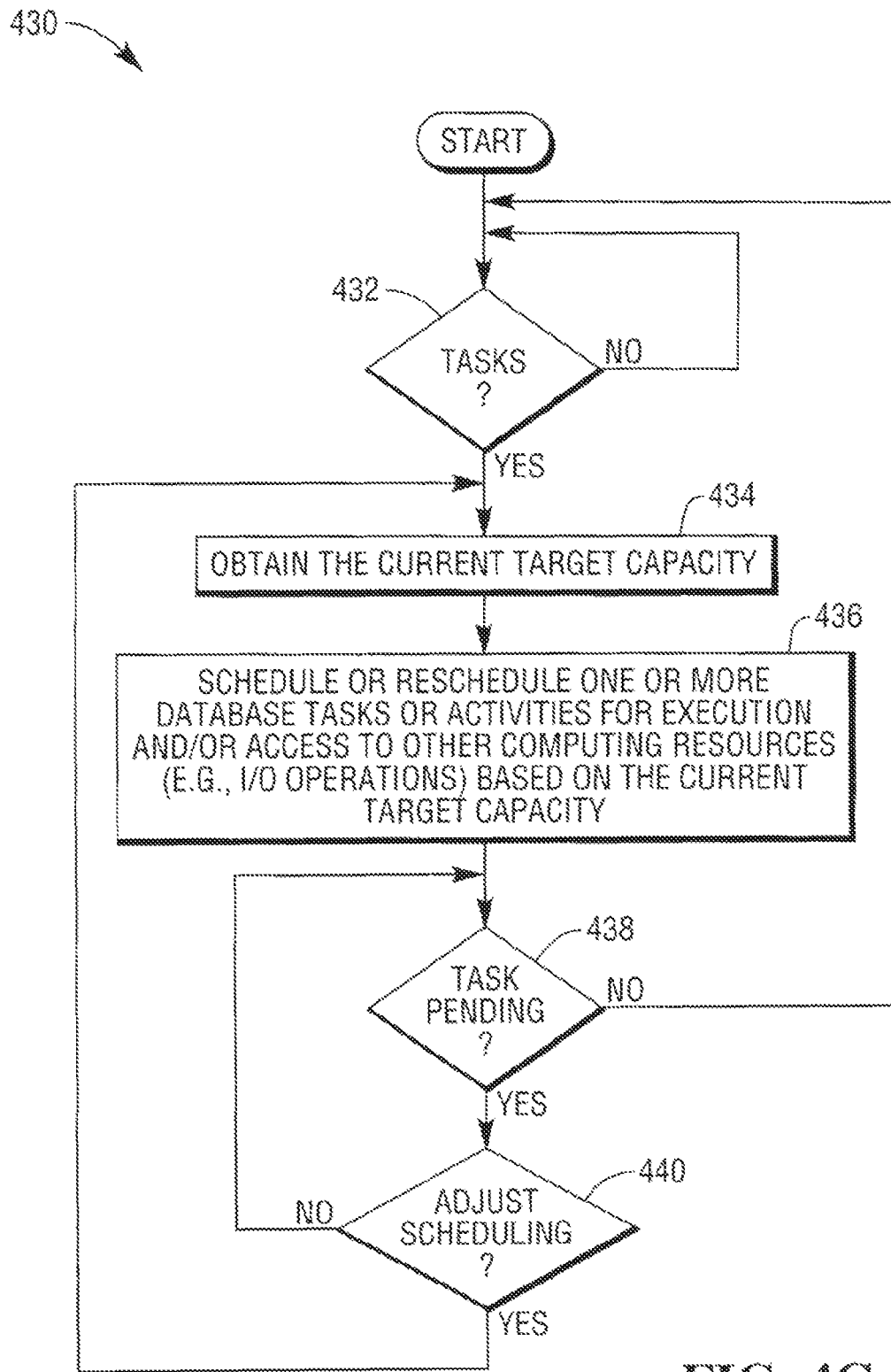
FIG. 4C depicts a method for processing one or more database tasks or activities in accordance with one embodiment of the invention.

To elaborate further, FIG. 4C depicts a method 430 for processing one or more database tasks or activities in accordance with one embodiment of the invention. Method 430 can, for example, represent in greater detail operations that may be performed to regulate (424) one or more database tasks based on target capacity in accordance to the method 420 depicted in FIG. 4B.

Referring to FIG. 4C, initially, it is determined (432) whether there is at least one database task or activity to process. In effect, method 430 can wait for a determination (432) that one or more database tasks or activities are to be processed. By way of example, it can be determined (432) that one or more database queries have been submitted for processing by the database.

If it is determined (432) that there is at least one database task or activity to process, the current target capacity of the database is obtained (434). In addition, one or more database tasks or activities are scheduled for execution and/or for access to other computing resources (e.g., access to an I/O operation) based on the current target capacity of the database. Typically, the scheduling (436) causes relatively longer delays for target capacities that are relatively lower with respect to full capacity. As such, a target capacity of, for example, fifty (50) percent can cause relatively longer delays in completion of one or more database tasks or activities than the delays that would be caused by a target capacity of seventy five (75) percent, but a target capacity of twenty five (25) percent could cause a significantly longer delay than the delay when the target capacity is at fifty (50) percent, and so on.

After the one or more database tasks or activities are scheduled (436), it is determined (438) whether at least one database task or activity is still pending. In other words, it can be determined (438) whether at least one database task or activity has not completed. If it is determined (438) that no task or activity is still pending, the method 430 can effectively wait (432) for one or more tasks or activities to be received for processing. However, if it is determined (438) that least one database task or activity is still pending, it can be determined (440) whether to adjust the scheduling of one or more tasks or activities that are still pending. By way of example, if the target capacity of the database has changed, it can be determined to reschedule one or more tasks or activities. As a result, execution of one or more tasks can be rescheduled and/or access to other computing resources can be rescheduled based on the current target capacity which is different than the target capacity at the time access to resources was initially scheduled for the one or more tasks or activities. As such, if it determined (440) to adjust the scheduling of one or more pending tasks or activities, the current target capacity can be obtained (434) and one or more tasks or activities that are pending can be rescheduled based on the current target capacity in a similar manner as discussed above.

Closed-Loop Capacity Management Architecture

In accordance with yet another aspect of the invention, a "closed-loop" capacity management architecture can be provided. As such, it will be appreciated that a capacity management system 400 (depicted in FIG. 4A) can, for example, be provided using or in a "closed-loop" capacity management architecture in accordance with one embodiment of the invention. The "closed-loop" capacity management architecture can, for example, be similar to the closed-loop workload management architecture described in U.S. Pat. No. 7,657,501, entitled: "Regulating the Work Load of a Database System," by "Brown et al." and filed on Aug. 10, 2004, which is hereby incorporated by reference herein in its entirety and for all purposes. As described in greater detail in the U.S. Pat. No. 7,657,501, entitled: "Regulating the Work Load of a Database System," a system provided in "closed-loop" workload management architecture can satisfying a set of workload-specific goals.

With respect to managing capacity, a system that can satisfy capacity goals or requirements in a "closed-loop" capacity management architecture will be described below in accordance with one embodiment of the invention. It should be noted that workload management and capacity management can be provided together in a system to allow meeting workload and capacity goals and requirements in accordance with another aspect of the invention. Since it may be more instructive to discuss a "closed-loop" system that can manage both workload and capacity of a database, a "closed-loop" capacity and workload management system is discussed below for the sake of comprehensiveness. However, as will be readily understood by those skilled in the art, it is not necessary to manage both capacity and workload of the database as each of these features can be provided separately even though it may be desirable to provide both of these features for some applications.

As noted in U.S. Pat. No. 7,657,501, entitled: "REGULATING THE WORK LOAD OF A DATABASE SYSTEM," an automated goal-oriented workload management system can support complex workloads and can self-adjust to various types of workloads. Major operational phases can include: 1) assigning a set of incoming request characteristics to workload groups, assigning the workload groups to priority classes, and assigning goals (called Service Level Goals or SLGs) to the workload groups; 2) monitoring the execution of the workload groups against their goals; 3) regulating (adjusting and managing) the workload flow and priorities to achieve the SLGs; 4) recommending adjustments to workload definitions (e.g. by splitting or merging workload definitions) in order to better isolate the subset of the workload that requires different workload management than the remainder of the original workload; and 5) correlating the results of the workload and taking action to improve performance.

The performance improvement can be accomplished in several ways: 1) through performance tuning recommendations such as the creation or change in index definitions or other supplements to table data, or to recollect statistics, or other performance tuning actions, 2) through capacity planning recommendations, for example increasing system power, 3) through utilization of results to enable optimizer adaptive feedback, and 4) through recommending adjustments to SLGs of one workload to better complement the SLGs of another workload that it might be impacting. Recommendations can either be enacted automatically, or after "consultation" with the database administrator ("DBA").

Figure 5:
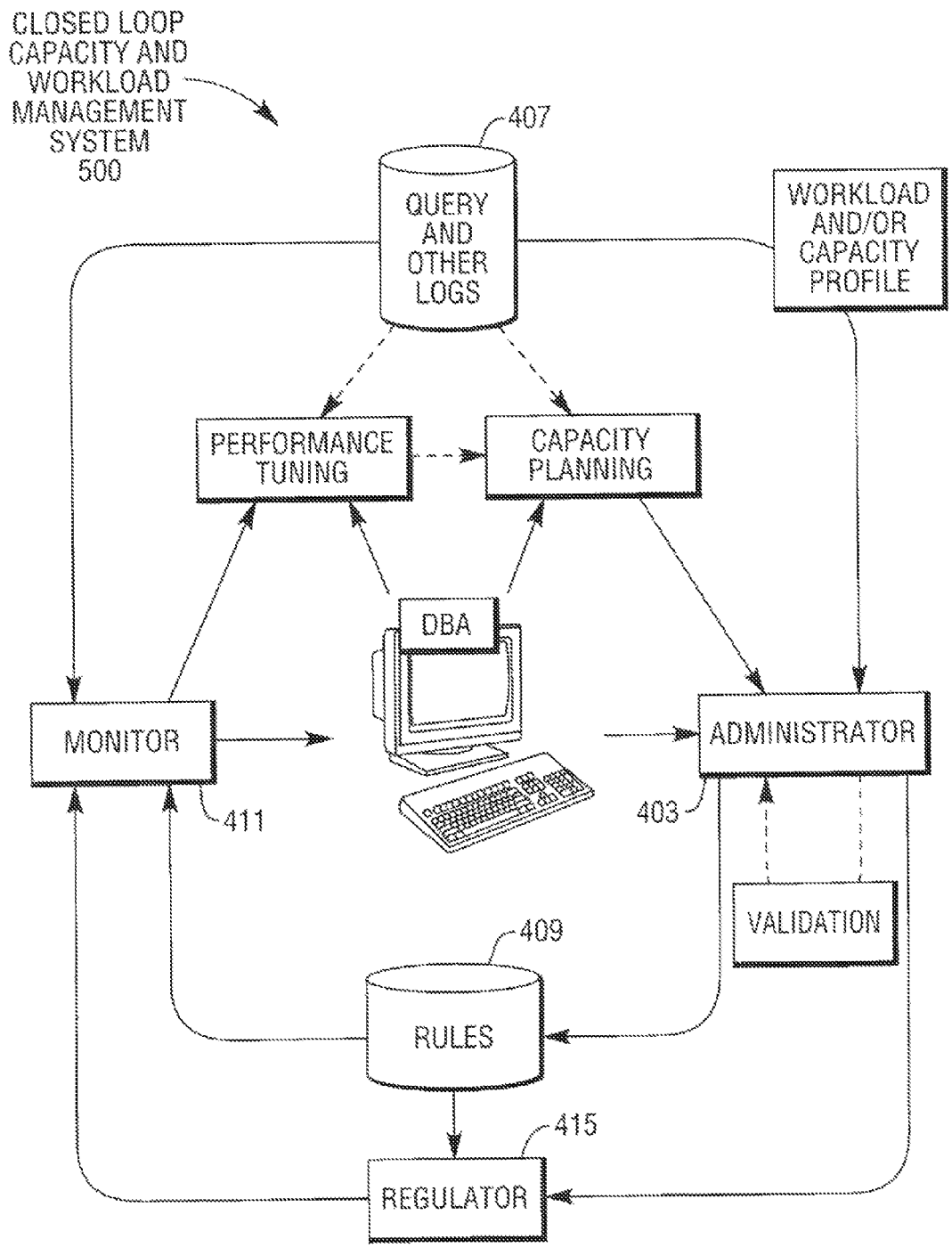
FIG. 5 depicts a "closed-loop" capacity and workload management system 500 in accordance with one embodiment of the invention.

FIG. 5 depicts a "closed-loop" capacity and workload management system 500 in accordance with one embodiment of the invention. Referring to FIG. 5, an administrator 403 can provide a GUI for defining rules 409 that can, for example, include capacity management rules, as well as workloads and their SLGs, and other workload or capacity management requirements. The administrator 403 accesses data in logs 407, including a query log and receives input including capacity and performance related inputs. The administrator 403 can be a primary interface for the DBA. The administrator can also establish rules 409, including capacity and workload rules, which can be accessed and used by other components of the closed-loop capacity management and workload management system 500.

A monitor 411 can effectively provide a top level dashboard view and the ability to drill down to various details of overall and individualized component capacity at various times, as well as workload group performance such as aggregate execution time, execution time by request, aggregate resource consumption, resource consumption by request, etc. Such data is stored in the query log and other logs 407 available to the monitor 411. The monitor 411 also includes processes that initiate the performance improvement mechanisms listed above and processes that provide long term trend reporting, which may include providing performance improvement recommendations. Some of the monitor 411 functionality may be performed by a regulator 415 which can monitor 411 capacity and workloads, for example, by using internal messaging system. The regulator 415 can dynamically adjust system settings including capacity and/or projects performance issues and can either alert the database administrator (DBA) or user to take action, for example, by communication through the monitor 411, which is capable of providing alerts, or through the exception log, providing a way for applications and their users to become aware of, and take action on, actions taken by the regulator 415. Alternatively, the regulator 415 can automatically take action by deferring requests or executing requests with the appropriate priority to yield the best solution given requirements defined by the administrator 403.

Figure 6:
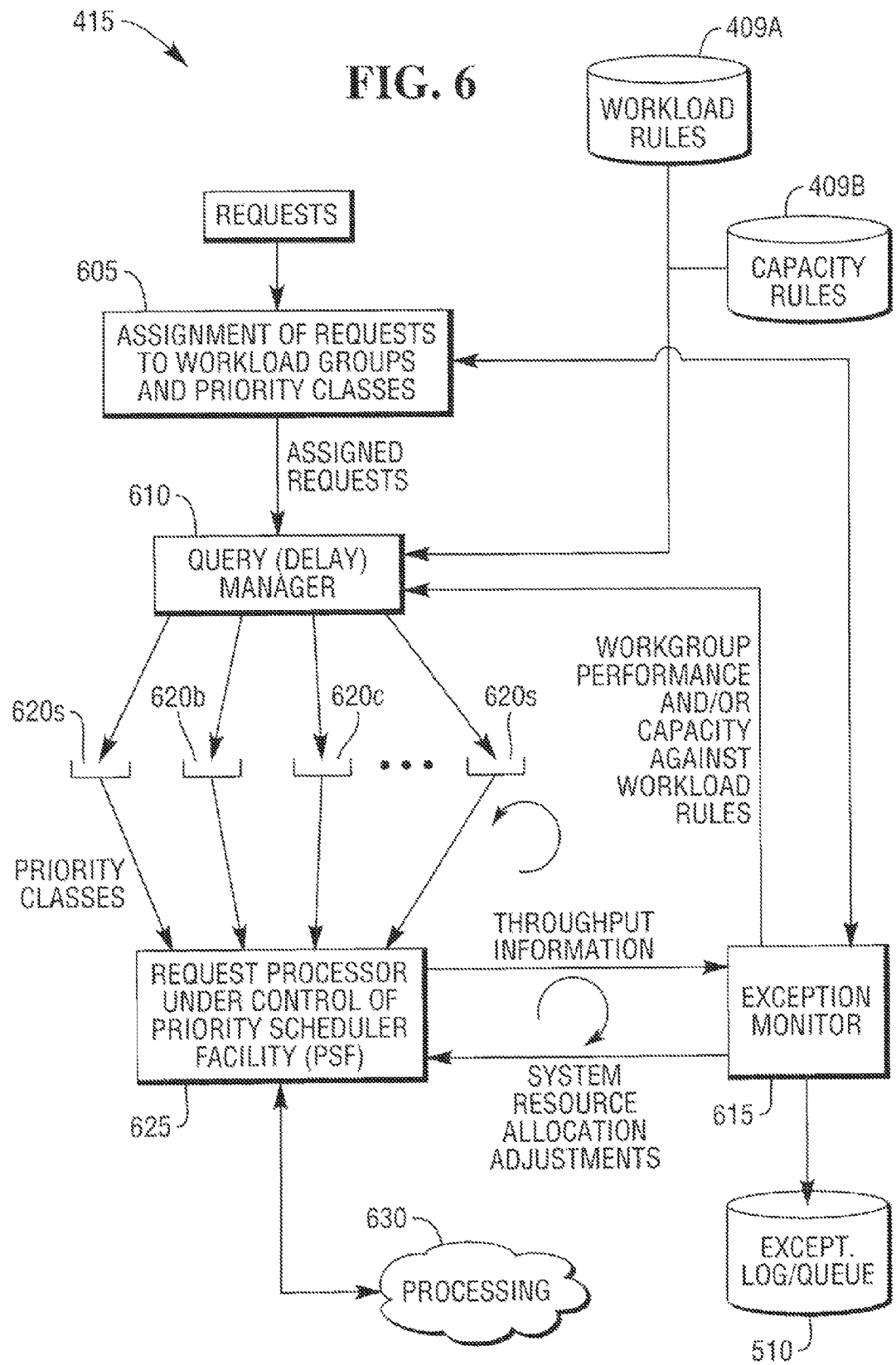
FIG. 6 depicts in greater detail the regulator in accordance with one embodiment of the invention.

FIG. 6 depicts in greater detail the regulator 415 in accordance with one embodiment of the invention. The regulator 415 can effectively regulate processing of requests based on current capacity and/or workload of a database by dynamically monitoring the capacity and workload characteristics using rules or other heuristics based on past and current performance of the system that guide two feedback mechanisms. It can do this before the request begins execution and at periodic intervals during query execution. Prior to query execution, the current capacity can be considered. Further, the workload characteristics of the query can be examined (e.g., an incoming request can be examined to determine in which workload group it belongs based on criteria).

As shown in FIG. 6, the regulator 415 can receive one or more requests, each of which can be assigned by an assignment process (block 605) to a workload group and, optionally, a priority class, in accordance with the workload rules 409a. The assigned requests can then be passed to a query (delay) manager 610. In addition, capacity rules and/or input 409b can be passed to the query (delay) manager 610. In general, the query (delay) manager 610 monitors the workload performance compared to the system capacity and/or the workload rules and either allows the request to be executed immediately or holds it for later execution, as described below. If the request is to be executed immediately, the query (delay) manager 610 places the request in the priority class bucket 620a-s corresponding to the priority class to which the request was assigned by the administrator 405. A request processor under control of a priority scheduler facility (PSF) 625 selects queries from the priority class buckets 620a-s, in an order determined by the priority associated with each of the buckets, and executes it, as represented by the processing block 630 on FIG. 6.

It should be noted that the query (delay) manager 610 and/or request processor under control of a priority scheduler facility (PSF) 625 can individually or collectively be operable to effectively delay processing of a request based on a current, a desired, or a target capacity. The request processor 625 can also monitor the request processing and report throughput information, for example, for each request and for each workgroup, to an exception monitoring process 615. The exception monitoring process 615 can compare the throughput with the workload rules 409 and can store any exceptions (e.g., throughput deviations from the workload rules) in the exception log/queue. In addition, the exception monitoring process 615 can provide system resource allocation adjustments to the request processor 625, which can adjust system resource allocation accordingly, e.g., by adjusting the priority scheduler weights. Further, the exception monitoring process 615 provides data regarding the workgroup performance against workload rules to the query (delay) manager 610, which can use the data to determine whether to delay incoming requests, depending on the workload group to which the request is assigned.

As shown in FIG. 6, the system provides two feedback loops, indicated by the circular arrows shown in the drawing. The first feedback loop includes the request processor 625 and the exception monitoring process 615. In this first feedback loop, the system monitors on a short-term basis the execution of requests to detect deviations greater than a short-term threshold from the defined service level for the workload group to which the requests were defined. If such deviations are detected, the DBMS is adjusted, e.g., by adjusting the assignment of system resources to workload groups. The second feedback loop includes the query (delay) manager 610, the request processor 625 and the exception monitoring process 615. In this second feedback loop, the system monitors on a long-term basis to detect deviations from the expected level of service greater than a long-term threshold. If it does, the system adjusts the execution of requests, e.g., by delaying, swapping out or aborting requests, to better provide the expected level of service. Note that swapping out requests is one form of memory control in the sense that before a request is swapped out it consumes memory and after it is swapped out it does not consume memory. While this is the preferable form of memory control, other forms, in which the amount of memory dedicated to an executing request can be adjusted as part of the feedback loop, are also possible.

Figure 7:
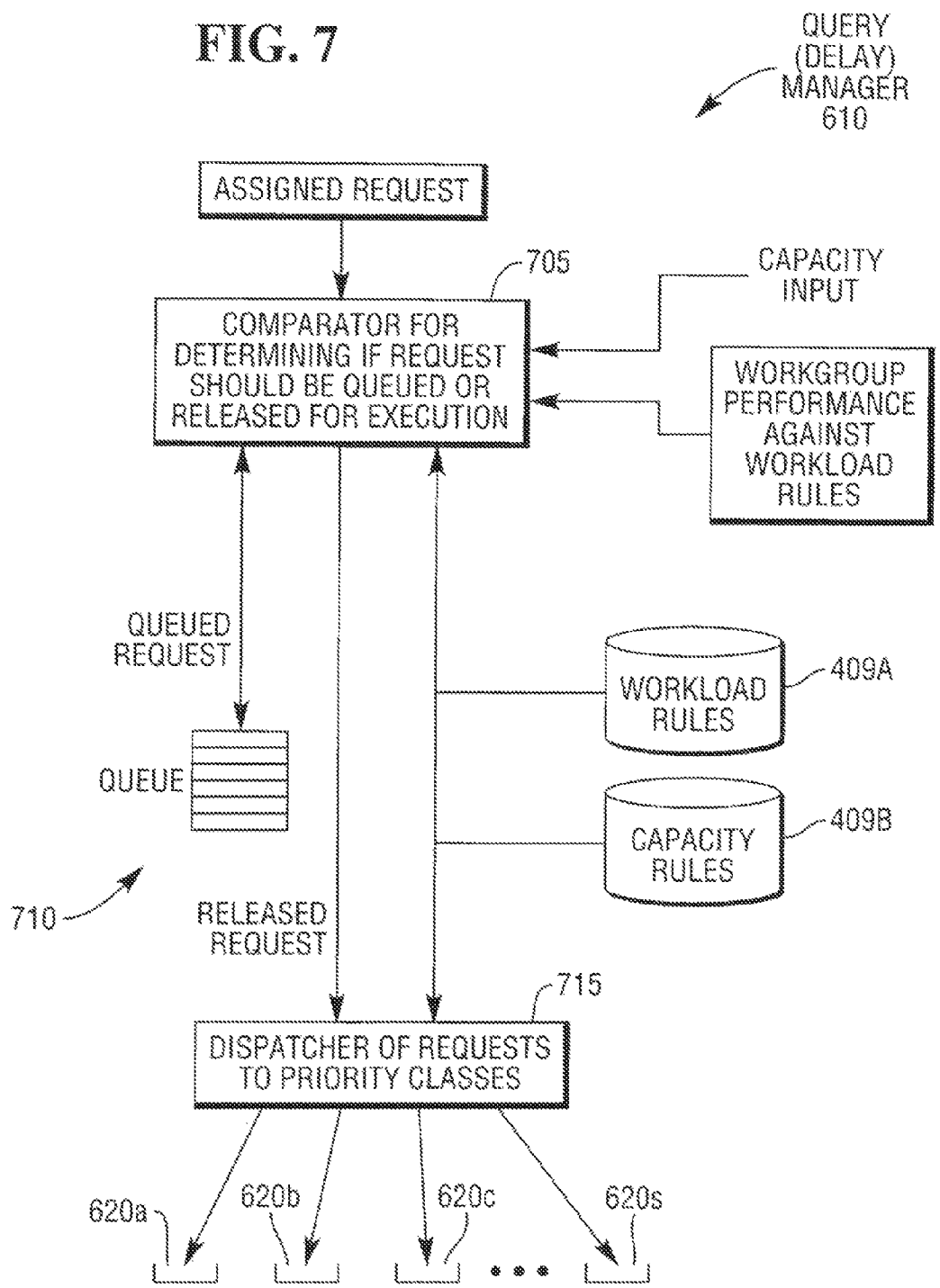
FIG. 7 depicts in greater detail query (delay) manager in accordance with one embodiment of the invention.

FIG. 7 depicts in greater detail query (delay) manager 610 (also shown in FIG. 6) in accordance with one embodiment of the invention. The query (delay) manager 610 receives an assigned request as an input. A comparator 705 determines if the request should be queued or released for execution. It does this based on the current or input capacity and/or by determining the workload group assignment for the request and comparing that workload group's performance against the workload rules, provided by the exception monitoring process 615. For example, the comparator 705 may examine the concurrency level of requests being executed under the workload group to which the request is assigned. Further, the comparator may compare the workload group's performance against other workload rules. If the comparator 705 determines that the request should not be executed, it places the request in a queue 710 along with any other requests for which execution has been delayed. The comparator 705 continues to monitor the workgroup's performance against the capacity and/or workload rules and when it reaches an acceptable level, it extracts the request from the queue 710 and releases the request for execution. In some cases, it may not be necessary for the request to be stored in the queue to wait for workgroup performance to reach a particular level, in which case it is released immediately for execution. Once a request is released for execution it is dispatched (block 715) to priority class buckets 620*a-s*, where it will await retrieval by the request processor 625.

Figure 8:
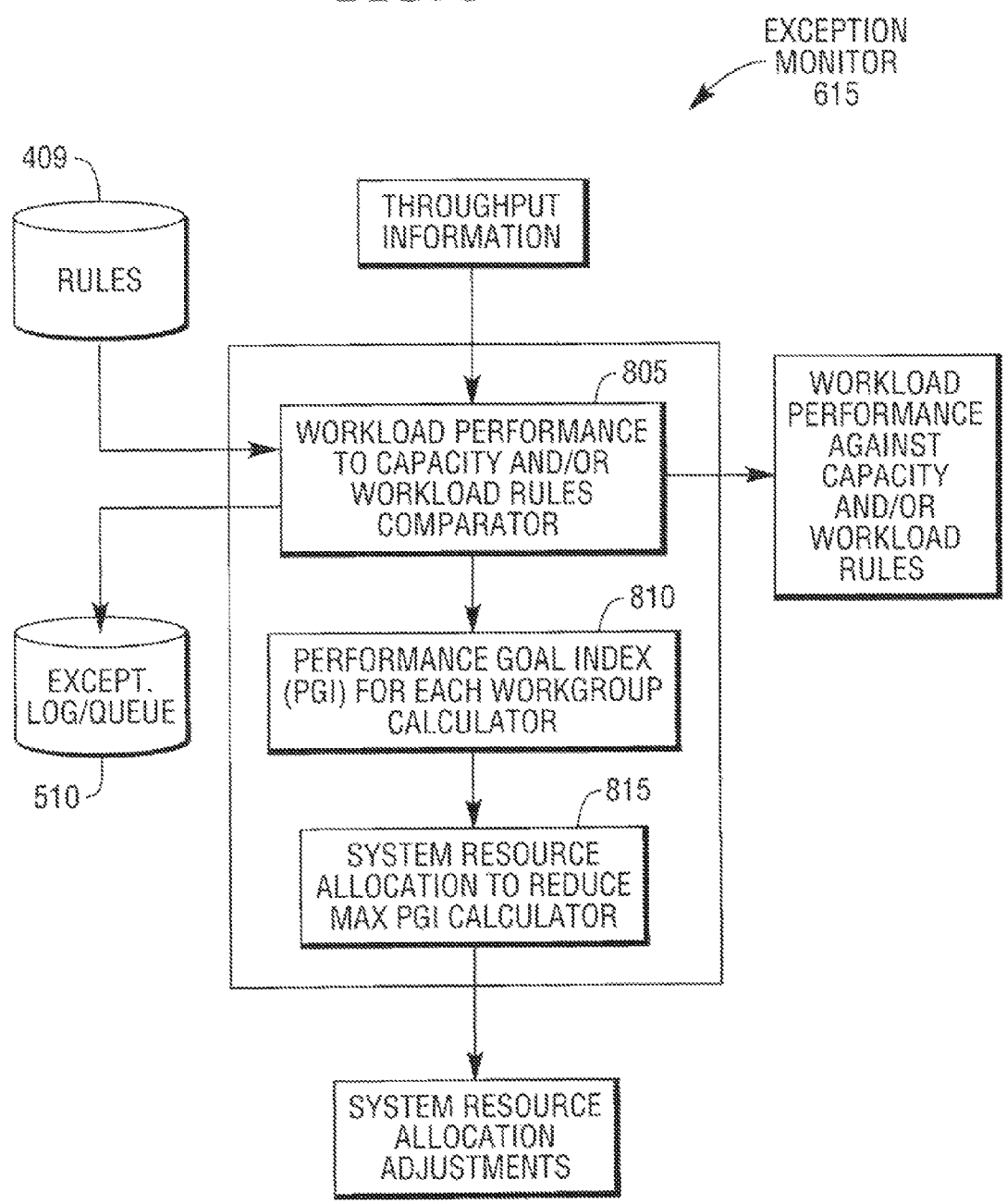
FIG. 8 depicts in greater detail an exception monitoring in accordance with one embodiment of the invention.

FIG. 8 depicts in greater detail an exception monitoring 615 in accordance with one embodiment of the invention. Exception monitoring 615 receives throughput information from the request processor 625. A workload performance to capacity and/or workload rules comparator 805 compares the received throughput information to the capacity rules and/or workload rules and logs any deviations that it finds in the exception log/queue 510. The capacity rules can effectively define performance for a workload at various capacities. The comparator 805 can also generate the workload performance against capacity and workload rules information which can be provided to the query (delay) manager 610. To determine what adjustments to the system resources are necessary, the exception monitoring process calculates a 'performance goal index' (PGI) for each workload group (block 810), where PGI is defined as the observed average response time (derived from the throughput information) divided by the response time goal (derived from the capacity and/or workload rules). Because it is normalized relative to the goal, the PGI is a useful indicator of performance that allows comparisons across workload groups. The exception monitoring process can adjust the allocation of system resources among the workload groups (block 815) using various techniques. For example, one technique is to minimize the maximum PGI for all workload groups for which defined goals exist. As another example, is to minimize the maximum PGI for the highest priority workload groups first, potentially at the expense of the lower priority workload groups, before minimizing the maximum PGI for the lower priority workload groups. These techniques can be specified by a DBA in advance through the administrator. An indication in the form of a system resource allocation adjustment is transmitted to the request processor 625. By seeking to minimize the maximum PGI for all workload groups, the system treats the overall workload of the system rather than simply attempting to improve performance for a single workload. In most cases, the system will reject a solution that reduces the PGI for one workload group while rendering the PGI for another workload group unacceptable. This approach means that the system does not have to maintain specific response times very accurately. Rather, it only needs to determine the correct relative or average response times when comparing between different workload groups.

Figure 9A:
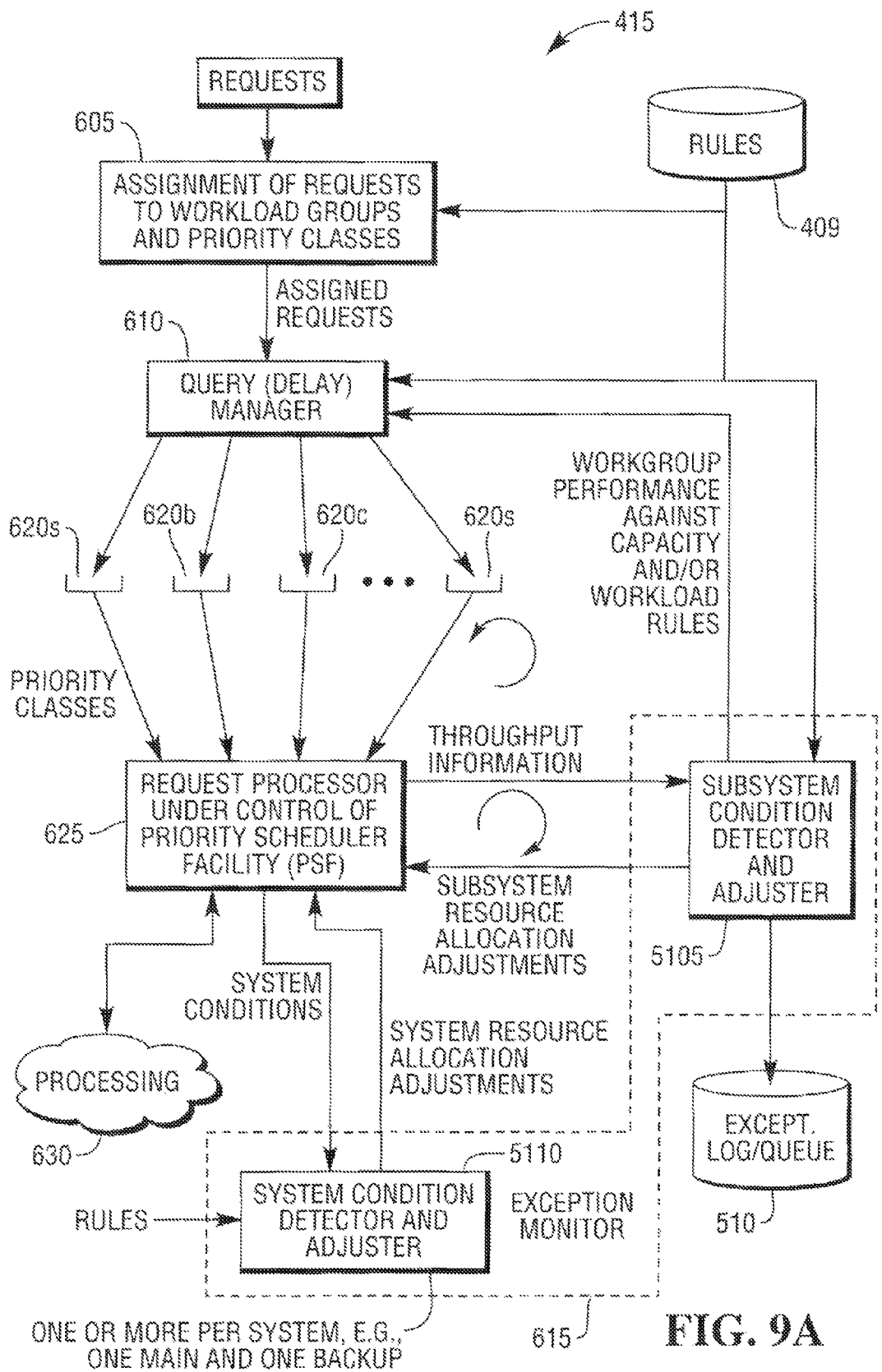
FIG. 9A depicts in greater detail an exception monitor as a part of a regulator in accordance with one embodiment of the invention.

FIG. 9A depicts in greater detail an exception monitor 615 as a part of a regulator 415 in accordance with one embodiment of the invention. Exception monitor 615 includes a subsystem condition detector and adjuster (SSCDA) 5105 and a system condition detector and adjuster (SCDA) 5110. As shown in FIG. 9A, in one example system there is one SCDA 5110 for the entire system. In some example systems, one or more backup SCDAs (not shown) are also provided that will operate in the event that SCDA 5110 malfunctions.

Figure 9B:
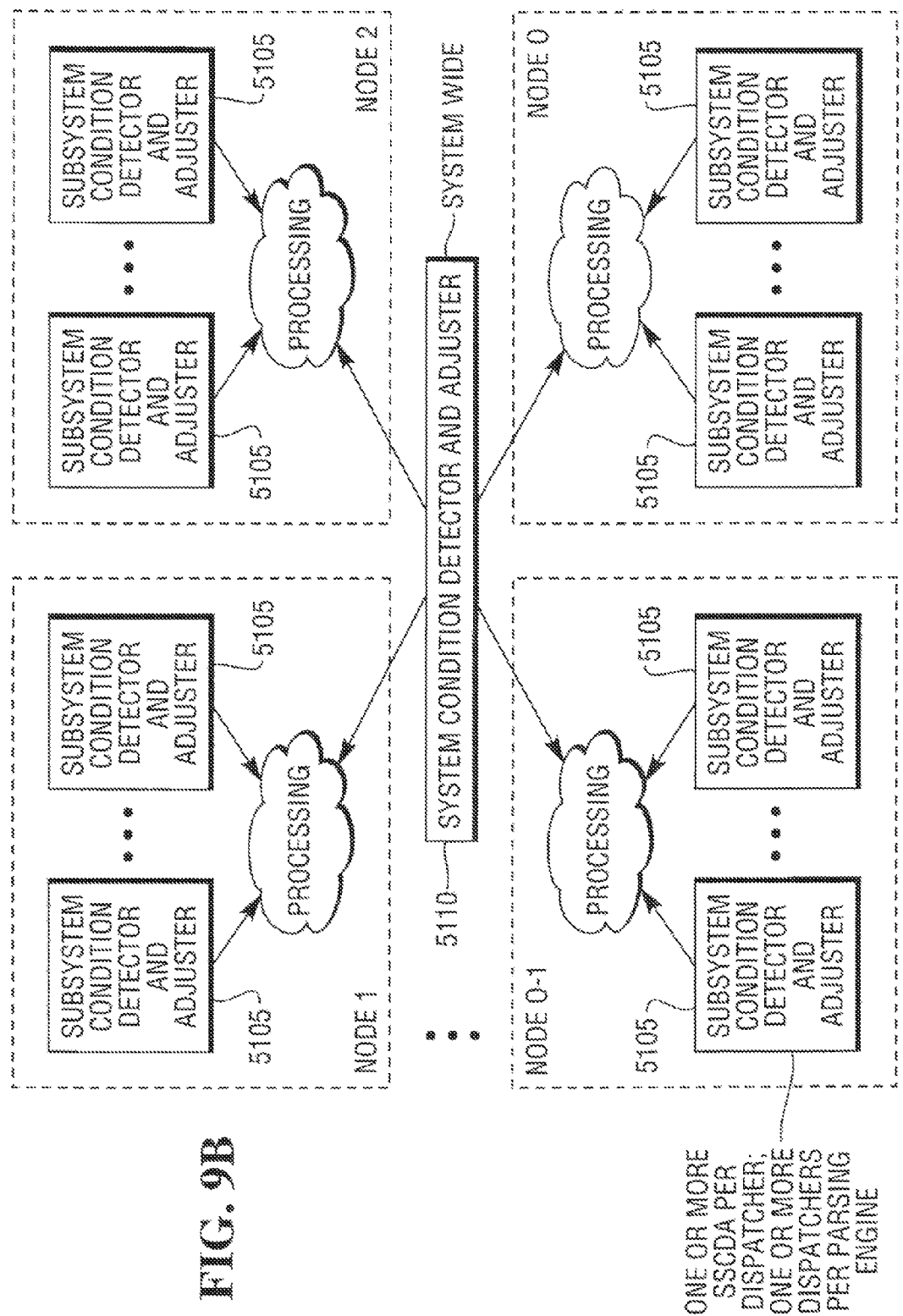
FIG. 9B depicts a subsystem condition detector and adjuster (SSCDA) and a system condition detector and adjuster (SCDA) in accordance with one embodiment of the invention.

As shown in FIG. 9B, there can be one SSCDA 5105 per dispatcher. However, more than one SSCDA 5105 per dispatcher can be provided. In addition, some systems may have only one dispatcher per parsing engine, although this is not a limitation of the concept described herein. Further, in some systems each parsing engine may run on a single node or across multiple nodes. In some example systems, each node will include a single parsing engine. Thus, for example, there may be one SSCDA per AMP, one per parsing engine, or one per node.

Returning to FIG. 9A, the SCDA monitors and controls resource consumption at the system level, while the SSCDA monitors and controls resource consumption at the subsystem level, where in some example systems, a subsystem corresponds with a single dispatcher. Some subsystems may correspond to a share of a dispatcher. Further, a subsystem may correspond to more than one dispatcher. Each SSCDA monitors and controls, in a closed loop fashion, resource consumption associated with a single subsystem. An SSCDA monitors throughput information that it receives from the request processor 625 and compares that performance information to the workload rules 409. The SSCDA then adjusts the resource allocation in the request processor 625 to better meet the workload rules.

The SCDA receives system conditions, compares the conditions to the workload rules, and adjusts the system resource allocations to better meet the system conditions. For convenience, FIG. 9A shows the SCDA receiving inputs from and sending outputs to the request processor 625. In another exemplary system, the inputs and outputs to and from the SCDA are handled as described below with respect to FIG. 9C.

Generally, the SSCDA provides real-time closed-loop control over subsystem resource allocation with the loop having a fairly broad bandwidth. The SCDA provides real-time closed-loop control over system resource allocation with the loop having a narrower bandwidth. The SCDA provides real-time closed-loop control over system resource allocation with the loop having a narrower bandwidth. Further, while the SSCDA controls subsystem resources and the SCDA controls system resources, in many cases subsystem resources and system resources are the same. The SCDA has a higher level view of the state of resource allocation because it is aware, at some level as discussed with respect to FIG. 9C, of the state of resource allocation of all subsystems, while each SSCDA is generally only aware of the state of its own resource allocation. A system may include some resources that are shared at a system level. Such resources would be truly system resources controlled by the SCDA.

One example of the way that the SCDA 5110 may monitor and control system resource allocations is illustrated in FIG. 9C. The SSCDAs are arranged in a tree structure, with one SSCDA (the root SSCDA 5305) at the top of the tree, one or more SSCDAs (leaf SSCDAs, e.g. leaf SSCDA 5310) at the bottom of the tree, and one or more intermediate SSCDAs (e.g. intermediate SSCDA 5315) between the root SSCDA and the leaf SSCDAs. Each SSCDA, except the root SSCDA 5305, has a parent SSCDA (i.e. the immediately-higher SSCDA in the tree) and each SSCDA, except the leaf SSCDA, has one or more child SSCDA (i.e. the immediately lower SSCDA in the tree). For example, in FIG. 9C, SSCDA 5315 is the parent of SSCDA 5310 and the child of SSCDA 5320.

In the example shown in FIG. 9C, the tree is a binary tree. It will be understood that other types of trees will fall within the scope of the appended claims. Further, while the tree in FIG. 9C is symmetrical, symmetry is not a limitation. The SCDA 5110 gathers system resource information by broadcasting to all SSCDAs a request that they report their current resource consumption. In one example system, each SSCDA gathers the information related to its resource consumption, as well as that of its children SSCDAs, and reports the compiled resource consumption information to its parent SSCDA. In one example system, each SSCDA waits until it has received resource consumption information from its children before forwarding the compiled resource consumption information to its parent. In that way, the resource consumption information is compiled from the bottom of the tree to the top. When the root SSCDA 5305 compiles its resource consumption information with that which is reported to it by its children SSCDAs, it will have complete resource consumption information for the SSCDAs in the system. The root SSCDA 5305 will report that complete information to the SCDA. The SCDA will add to that information any resource consumption information that is available only at the system level and make its resource allocation adjustments based on those two sets of information.

In another exemplary system, each of the SSCDAs communicates its resource consumption information directly to the SCDA 5110. The SCDA 5110 compiles the information it receives from the SSCDAs, adds system level resource consumption information, to the extent there is any, and makes its resource allocation adjustments based on the resulting set of information.

There are at least two ways by which the SCDA 5110 can implement its adjustments to the allocation of system resources. The first, illustrated in FIG. 9A, is for the SCDA 5110 to communicate such adjustments to the request processor 625. The request processor 625 implements the adjustments to accomplish the resource allocation adjustments.

Alternatively, the SCDA 5110 can communicate its adjustments to the SSCDAs in the system, either directly or by passing them down the tree illustrated in FIG. 53. In either case, the SSCDAs incorporate the SCDA's resource allocation adjustments in the subsystem resource allocation adjustments that it sends to the request processor 625.

Capacity Management for Multi-Node, Parallel Database Systems

Figure 10:
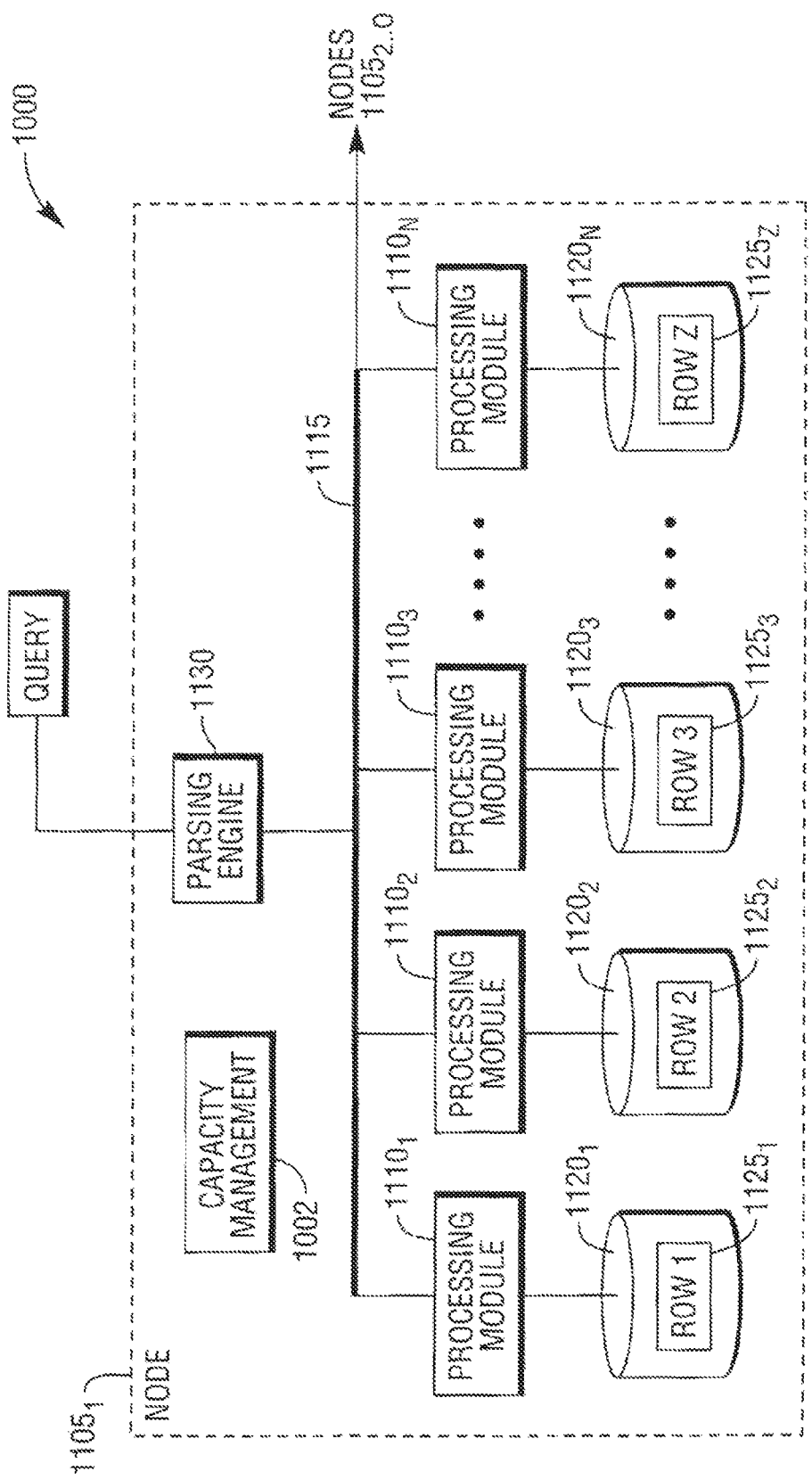
FIG. 10 depicts a database node of a database system or database management system (DBMS) in accordance with one embodiment of the invention.

The techniques described above are especially suitable for multi-node, parallel databases, including those that use a massively parallel processing (MPP) architecture or system. To further elaborate FIG. 10 depicts a database node 1105 of a database system or database management system (DBMS) 1000 in accordance with one embodiment of the invention. The database system 1000 can, for example, be provided as a Teradata Active Data Warehousing System. FIG. 10 depicts an exemplary architecture for one database node $1105_1$ of the DBMS 100 in accordance with one embodiment of the invention. The DBMS node $1105_1$ includes one or more processing modules 1110-N connected by a network 1115, that manage the storage and retrieval of data in data-storage facilities $1120_{1-N}$. Each of the processing modules 1110-N represent one or more physical processors or virtual processors, with one or more virtual processors running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are four (4) virtual processors and four (4) physical processors, then typically each virtual processor would run on its own physical processor. If there are 8 virtual processors and 4 physical processors, the operating system would schedule the eight (8) virtual processors against the four (4) physical processors, in which case swapping of the virtual processors would occur. Each of the processing modules $1110_{1-N}$ manages a portion of a database stored in a corresponding one of the data-storage facilities $120_{1-N}$. Each of the data-storage facilities $1120_{1-N}$ can includes one or more storage devices (e.g., disk drives). The DBMS 1000 may include additional database nodes $1105_{2-O}$ in addition to the node $1105_1$. The additional database nodes $1105_{2-O}$ are connected by extending the network 1115. Data can be stored in one or more tables in the data-storage facilities $1120_{1-N}$. The rows $1125_{1-z}$ of the tables can be stored across multiple data-storage facilities $1120_{1-N}$ to ensure that workload is distributed evenly across the processing modules $1110_{1-N}$. A parsing engine 1130 organizes the storage of data and the distribution of table rows $1125_{1-z}$ among the processing modules $1110_{1-N}$. The parsing engine 1130 also coordinates the retrieval of data from the data-storage facilities $1120_{1-N}$ in response to queries received, for example, from a user. The DBMS 1000 usually receives queries and commands to build tables in a standard format, such as SQL.

In one implementation, the rows $1125_{1-z}$ are distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $1120_{1-N}$ and associated processing modules $1110_{1-N}$ by a hash bucket map. The characteristics of the columns chosen for the primary index determine how evenly the rows are distributed.

Referring to FIG. 10, it should be noted that a capacity management node component 1002 can be provided as a separate entity (or component, or module) or can be at least partially implemented in the parsing engine 1130. In addition, a capacity management central component 1004 can be provided as a central component that can effectively coordinate and/or manage the capacity of the DBMS 1000.

Figure 11:
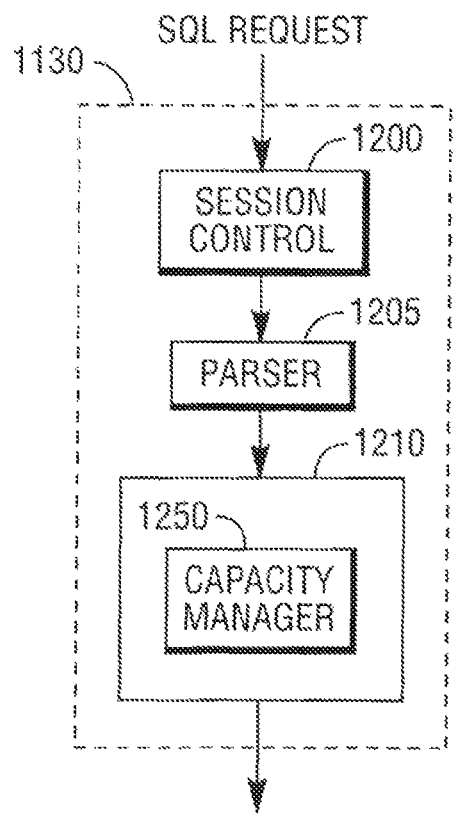
FIG. 11 depicts a Parsing Engine (PE) in accordance with one embodiment of the invention.

In one exemplary system, the parsing engine 1130 is made up of three components: a session control 1200, a parser 1205, and a dispatcher 1210, as shown in FIG. 11. The session control 1200 provides the logon and logoff function. It accepts a request for authorization to access the database, verifies it, and then either allows or disallows the access. When the session control 1200 allows a session to begin, a user may submit a SQL request, which is routed to the parser 1205. Regarding the dispatcher 1210, it should be noted that some monitoring functionality for capacity and workload management may be performed by a regulator (e.g., regulator 415). The Regulator can monitor capacity and workloads internally. It can, for example, do this by using internal messages sent from the AMPs to the dispatcher 1210. The dispatcher 1210 provides an internal status of every session and request running on the system. It does this by using internal messages sent from the AMPs to the dispatcher 1210. The dispatcher 1210 provides an internal status of every session and request running on the system. As such, at least part of a capacity management system (capacity management 1250) can be provided by the dispatcher 1210 which operates as a capacity and workload enhanced dispatcher in order to effectively manage capacity and/or workload in the DBMS 1000.

Figure 12:
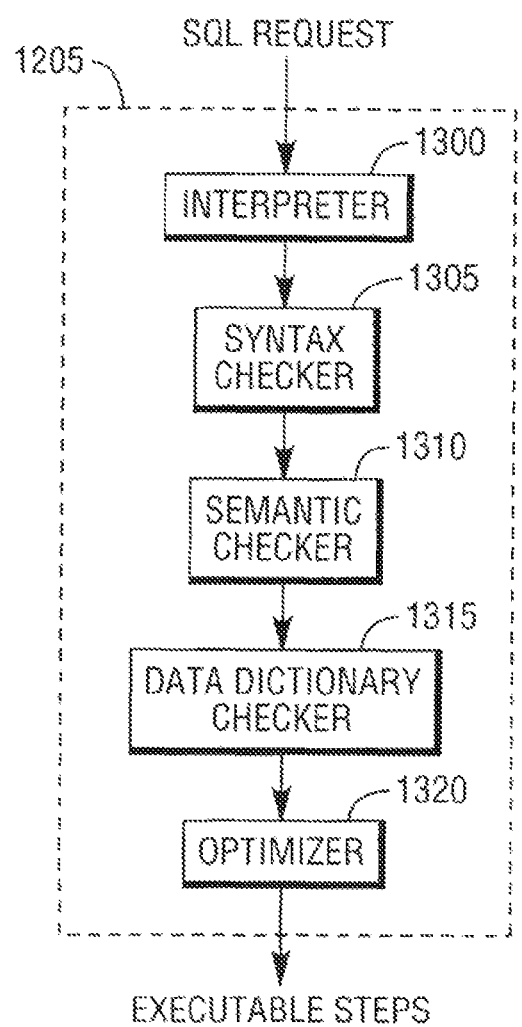
FIG. 12 depicts a Parser in accordance with one embodiment of the invention.

As illustrated in FIG. 12, the parser 1205 interprets the SQL request (block 1300), checks it for proper SQL syntax (block 1305), evaluates it semantically (block 1310), and consults a data dictionary to ensure that all of the objects specified in the SQL request actually exist and that the user has the authority to perform the request (block 1305). Finally, the parser 1205 runs an optimizer (block 1320), which generates the least expensive plan to perform the request.

System conditions that can be considered by DBMS can, for example, include: Memory—the amount of system and subsystem memory currently being used. It is possible that the system will include some memory that is shared among all of the subsystems. AMP worker tasks (AWT)—the number of available AWTs. An AWT is a thread or task within an AMP for performing the work assigned by a dispatcher. Each AMP has a predetermined number of AWTs in a pool available for processing. When a task is assigned to an AMP, one or more AWTs are assigned to complete the task. When the task is complete, the AWTs are released back into the pool. As an AMP is assigned tasks to perform, its available AWTs are reduced. As it completes tasks, its available AWTs are increased. FSG Cache—the amount of FSG cache that has been consumed. The FSG cache is physical memory that buffers data as it is being sent to or from the data storage facilities. Arrival Rates—the rate at which requests are arriving. Arrival rate can be broken down and used as a resource management tool at the workload basis. Co-existence—the co-existence of multiple types of hardware. Skew—the degree to which data (and therefore processing) is concentrated in one or more AMPs as compared to the other AMPs. Blocking (Locking)—the degree to which data access is blocked or locked because other processes are accessing data. Spool—the degree of consumption of disk space allocated to temporary storage. CPU—the number of instructions used per second. I/O—the datablock I/O transfer rate. Bynet latency—the amount of time necessary for a broadcast message to reach its destination.

The techniques for communication between the SCDA 5110 and the SSCDAs can, for example, be accomplished by a single process running across all of the nodes and all of the AMPS, by multiple processes, where each process executes on a separate AMP, or by processes that can run on more than one, but not all, of the AMPs. "Process" should be interpreted to mean any or all of these configurations.

Since the SCDA 5110 has access to the resource consumption information from all SSCDAs, it can make resource allocation adjustments that are mindful of meeting the system workload rules. It can, for example, adjust the resources allocated to a particular workload group on a system-wide basis, to make sure that the workload rules for that workload group are met. It can identify bottlenecks in performance and allocate resources to alleviate the bottleneck. It can remove resources from a workload group that is idling system resources. In general, the SCDA 5110 provides a system view of meeting workload rules while the SSCDAs provide a subsystem view.

Managing Errors (e.g., Scheduling Mistakes) and Performance Issues in a Capacity Controlled Environment As noted above, capacity of a system and/or a database operating in the system can be controlled in a dynamic and/or automatic manner. In particular, the capacity of a database or database system can be controlled in a dynamic and/or automatic manner, for example, using one or more of the techniques noted above. By way of example, a database system or Data Base Management System (DBMS) can dynamically adjust a "throttle" for access to resources, based on time periods or other events. In addition, virtually, any resource, including, for example, disk space, disk I/O, and memory can be controlled by using, for example, a delay mechanism because accessing a resource can be effectively delayed and/or a resource (e.g., a portion of disk space, a processor) can be rendered effectively inaccessible and/or inoperable.

In an environment where capacity is dynamically controlled (e.g., a COD environment), resources can be effectively "rented" by a customer, for example, during anticipated periods of heavy demand in accordance with one or more of the techniques noted above. In addition, a COD architecture provided in accordance with the techniques noted above that allows use or temporarily use excess and/or additional capacity or resources to handle various situations, including, for example, errors and/or system-identified exceptions (e.g., performance problems).

In other words, a COD enforcement mechanism can be provided that allows controlled use of excess of capacity for a number of desired situations. For example, a COD enforcement mechanism can be provided, by an automated DBMS in accordance with one or more of the techniques noted above. As such, a DBMS can conceptually or logically partition resources or system resources into what can be considered to be "regular" capacity or pools of resources (e.g., paid resources) and excess capacity or "COD-only" capacity (e.g., unpaid resources) including pools of resources that are not part of the regular capacity, where the DBMS can effectively prevent tasks (or operations or work), especially database work, from using the COD-only pools. However, the DBMS can effectively allow some tasks to access the COD-only capacity under one or more conditions or situations, for example, when explicit permission has been granted for a task to access a COD-only pool or access resource capacity assigned to be COD-only. In case of a parallel architecture noted above, those skilled in the art will readily appreciate that COD-only pools can, for example, include spool space, file system cache, CPU, etc. The COD-only pools can, for example, be included in a configuration for each AMP virtual processor, as will also be readily appreciated by those skilled in the art.

It is noted that using the COD-only pools (or COD-only resources) to respond to a wide class of performance issues may not be an ideal solution for all situations. However, it will be appreciated that using the COD-only resources to address errors, including resource estimation errors and resources estimation inaccuracies, can be useful at least in some situations, especially when a certain level of performance is designed and/or promised to be delivered to a customer. In the real world, especially when operating large and complex database systems, some classes of performance problems may be due to an error, viewed by customers as "bugs," for which there may not be a graceful remedy readily available. In such cases, customers will often report a problem incident that might be very costly for a database vendor to investigate and repair immediately. For this class of problems, the most cost effective solution for both parties (vendor and customer) may be to at least temporarily use the excess capacity of a COD system to alleviate the performance issue.

In accordance with one aspect of the invention, excess capacity available in a capacity controlled database system can be used when a condition or a trigger occurs. Such a condition or trigger can, for example, be caused by what may be considered to be an error (e.g., a bug) or deviation in the system. In situations that an error degrades performance, excess capacity can be used to alleviate the performance issues allowing a database system to perform as expected despite error conditions that may occur from time to time.

In the context of a capacity management system or subsystem described above, resource usage can be dynamically controlled in a system that includes a database. More specifically, a capacity management system can, for example, be provided by one or more query scheduling features that rely on an estimation of resource usage from a query optimizer. In addition, one or more runtime monitoring features can detect "negative" system performance conditions so that corrective action can be taken.

For example, for queries with a high estimated resource usage, where "high" can, for example, be defined by a user (user defined rules), a scheduler can delay execution of the queries until a period of low system activity and/or effectively throttle or limit the number of such queries that can run concurrently. Monitoring features can then periodically measure the overall resource contention, as well as the resource usage of individual queries. If contention or excessive use is detected, it will adjust the relative priority of certain queries to ensure service level goals are still met. As a result, one or more selected queries (e.g., "run-away queries") may even be aborted. However, it will be appreciated that such queries need not be aborted to preserve the performance of the system. Instead, excess capacity can be used to effectively deal with such situations to allow completion of one or more selected queries (e.g., "run-away queries") without adversely affecting the performance of the database system.

Queries that may be problematic can be identified based on one or more characteristics in accordance with another aspect of the invention. For example, one or more of the following characteristic can be defined and detected for a request or query made from a database.

(i) Consumption beyond a determined amount (or an excessive amount) of one or more resources (e.g., spool space, file system cache, or CPU). The determined amount can, for example, be defined by one or more resource rules defined by a user, database administrator, system or default rules, determined dynamically based on one or more current system conditions and/or events.

(ii) Inaccurate resource estimates made by a Query Optimizer for resources needed to complete a request or query made from a database. Generally, in such case, an accurate estimation would have resulted in delaying or delaying further the execution of the request or query.

(iii) Assignment of confidence greater than low by a Query Optimizer, implying that the necessary information (e.g., statistics) was available for resource estimation.

(iv) Current availability of sufficient spool or cache in the COD-only pool to satisfy the resource needs that are now more accurately known at runtime.

The above exemplary characteristics can, for example, represent "expensive" queries that were improperly scheduled for execution as a result of inaccurate resource estimates made by the query optimizer. A request or query made from the database that meets one or more conditions above and/or is consistent with or occurs at one or more conditions or events noted above (e.g., current availability of sufficient spool or cache) can be considered a "problematic" query that may be processed using the excess capacity of database operating in a capacity controlled environment.

As generally known in the art, even the most sophisticated query optimizers can occasionally make such mistakes. These mistakes can be due to the inherent limitations of current SQL optimizer technology, which relies on summary statistics to estimate the selectivity of predicates (WHERE clause conditions). Conventionally, the available corrective actions to take against such queries (run-away queries) include lowering their CPU priority or aborting them, neither of which may be ideal or palatable to users. Lowering the CPU priority rarely provides immediate relief to overall system resource contention and aborting a query may be too severe.

In accordance with another aspect of the invention, excess capacity or additional COD-only resources can be provided to allow execution of requests or queries based on one or more criteria (e.g., quires that can cause contention of resources in an unacceptable manner). By way of example, additional COD-only resources can be provided for execution of run-away queries based on one or more of the exemplary conditions noted above. As a result, problematic queries, such as, "run-away" queries need not be aborted as their execution can be continued without further contention with other queries competing for the "regular" (e.g., paid for) resources in the current configured capacity (e.g., half of the full capacity). The COD-only resources can be provided on a temporary basis and can be measured.

For example, in the case of excessive spool space, the remaining operations of the identified run-away query can be granted access to COD-only spool space for all subsequent spool requests. As another example, in the case of excessive cache usage, the executing operations of the identified run-away query can be granted access to COD-only cache for all subsequent cache requests.

To elaborate even further, consider a multi-way join query with an execution plan requiring a large intermediate binary join result to be stored in a spool file. If the query optimizer significantly underestimates the required spool size, the scheduler may mistakenly schedule it for immediate execution on a busy system where available spool is already low. After a monitoring component detects that the query is using significantly more spool than anticipated, the query can be detected as a run-away query. As a result, COD-only spool space can be made available by the monitor and/or another component of a DBMS for the remainder of the query's execution. As another example, consider a customer query whose chosen execution plan involves a hash join algorithm that requires the inner table (or spool) to fit entirely within cache. If the optimizer grossly underestimates the size of the inner table, the scheduler may mistakenly execute the query when the availability of cache is insufficient. Once the monitoring component realizes that the query requires significantly more cache than anticipated, it could make the COD-only cache available for the remainder of the hash join operation.

It should be noted that if the execution of a run-away query can be completed by temporarily using excess COD-only resources, the performance of other queries running in the regular (paid) portion of the system could be improved as result of less resource contention. Because these corrective actions can happen automatically by actions taken by a DBMS in accordance with one embodiment of the invention, end-users or customers need not be unaware of any performance issue as the DBMS can resolve the performance issues with requiring input from end-users or customers.

Also, to prevent occurrence of the same or similar issues in the future, a DBMS can be configured to gather relevant information for the COD-usage event in accordance with one embodiment of the invention. In addition, the DBMS can be configured to report such issues, for example, to customer support as a non-critical incident. It will be appreciated that the use of COD-only pool when a problematic or performance issue (e.g., run-away queries) arises allows investigation of such problem in a non-crises mode where further improvements can be made, for example, to a query optimizer, a query scheduler, etc.

Query Optimization in a Capacity Controlled Environment

As noted above, capacity of a system and/or a database operating in the system can be controlled in a dynamic and/or automatic manner in accordance with the techniques of the invention disclosed above. In particular, the capacity of a database or database system can be controlled in a dynamic and/or automatic manner, for example, using one the techniques noted above. Further, COD-only capacity or pools of resources (COD-only pools) can be provided to process one or more selected database requests and queries in accordance with techniques discussed in the previous section to manage errors and performance issues.

In accordance with yet another aspect of the invention, COD-only capacity (or COD-only pool of resources) can be provided for query optimization or to further optimize query plans. By way of example, an additional phase of query optimization may be performed in COD-only capacity (or pool). It may not be feasible to perform this additional phase of query optimization using just the normal capacity (i.e., by using just the normal resource pool) due to time and resource constraints. More specifically, additional optimization can, for example, be performed on selected cached or stored query plans that have already undergone through standard optimization.

As will readily be appreciated by those skilled in the art, the solution space of alternative query plans for large complex SQL queries can be very large, and hence standard optimization may not perform an exhaustive search. On the other hand, performing a "full optimization" could consume too many CPU resources and negatively impact the response time of the query. A significant drawback to standard optimization (e.g., a pruned search) is that in some cases the performance of the chosen sub-optimal plan may not achieve the customer's Service Level Goal (SLG) for that query.

It will also be appreciated that using excess resource capacity of a system in a capacity controlled system (e.g., COD-only pools of a COD system) to perform additional optimization can result in finding more efficient execution plans, thereby enhancing system performance. Additional optimization can be performed as a background optimization for a query without hindering the execution of other queries being executed on the normal pool or resources available in the configured or controlled capacity.

In view of the foregoing, it will be readily apparent that a capacity management system can allow using excess capacity for optimization of query plans in accordance with one embodiment of the invention. The capacity management system can, for example, periodically examine optimized plans. The optimized plans can, for example, reside within a Parsing Engine request cache and a delay queue in a system noted above, or can be stored on disk for a database engine that supports compiled query plans stored on disk, etc.

In any case, one or more selected criteria can be applied to identify plans whose performance is likely to be improved with additional optimization. Such criteria, can for example, include (a) plans whose estimated time does not achieve the query's defined SLG, (b) expensive plans whose estimated elapsed time or resources consumed exceeds a configurable threshold (e.g., default of ten (10) minutes elapsed time), or (c) highly complex queries identified as those whose number of execution operations or steps exceeds a configurable threshold (e.g., default is >20 steps). When identified, the selected queries can, for example, be re-submitted to the SQL Parsing Engine along with a special "further optimize" designation, whereby the assigned PE task can be scheduled to run in the excess COD-only portion of the system with, for example, an assigned low CPU priority.

Queries labeled as "further optimize" need not be subject to the normal search space pruning heuristics used by an Optimizer, thereby allowing a relatively more complete/exhaustive optimization to take place. Such tasks can continue to run in the background until, for example, one of the following events occurs: (1) the associated plan being improved upon is removed from the cache or delay queue, (2) an improved plan is found that meets the query's required SLG and is cheaper than currently cached or delayed plan, or (3) the optimization process runs to full completion. Upon occurrence of event numbered (2) or (3) the identified best plan is used to replace the original optimized plan that currently exists in the cache or delay queue for that query. The plan can be marked as "fully optimized" to avoid subsequent attempts to optimize it further.

It is noted that an additional optimization process can operate without regard to an original optimization process and hence may be duplicating a portion of the optimization already performed. However, duplication may be acceptable since this additional optimization can be performed at low priority in the background in accordance with the techniques of the invention. It should be noted that for query optimizers that accept an initial plan, "seeding" can be used to "seed" a further-optimization process with the best plan from the original optimization, as will be appreciated by those skilled in the art. Not only the "seeding" can ensure that the newly identified best plan is at least as good as before, "seeding" can also be used by the plan selection logic to help narrow and guide the search. Generally, the process of continually trying to improve the efficiency of cached or delayed plans using optimizer tasks running on the unused capacity of the system can in turn improve the performance of running queries.

Managing Excess Capacity of a Database

Figure 13:
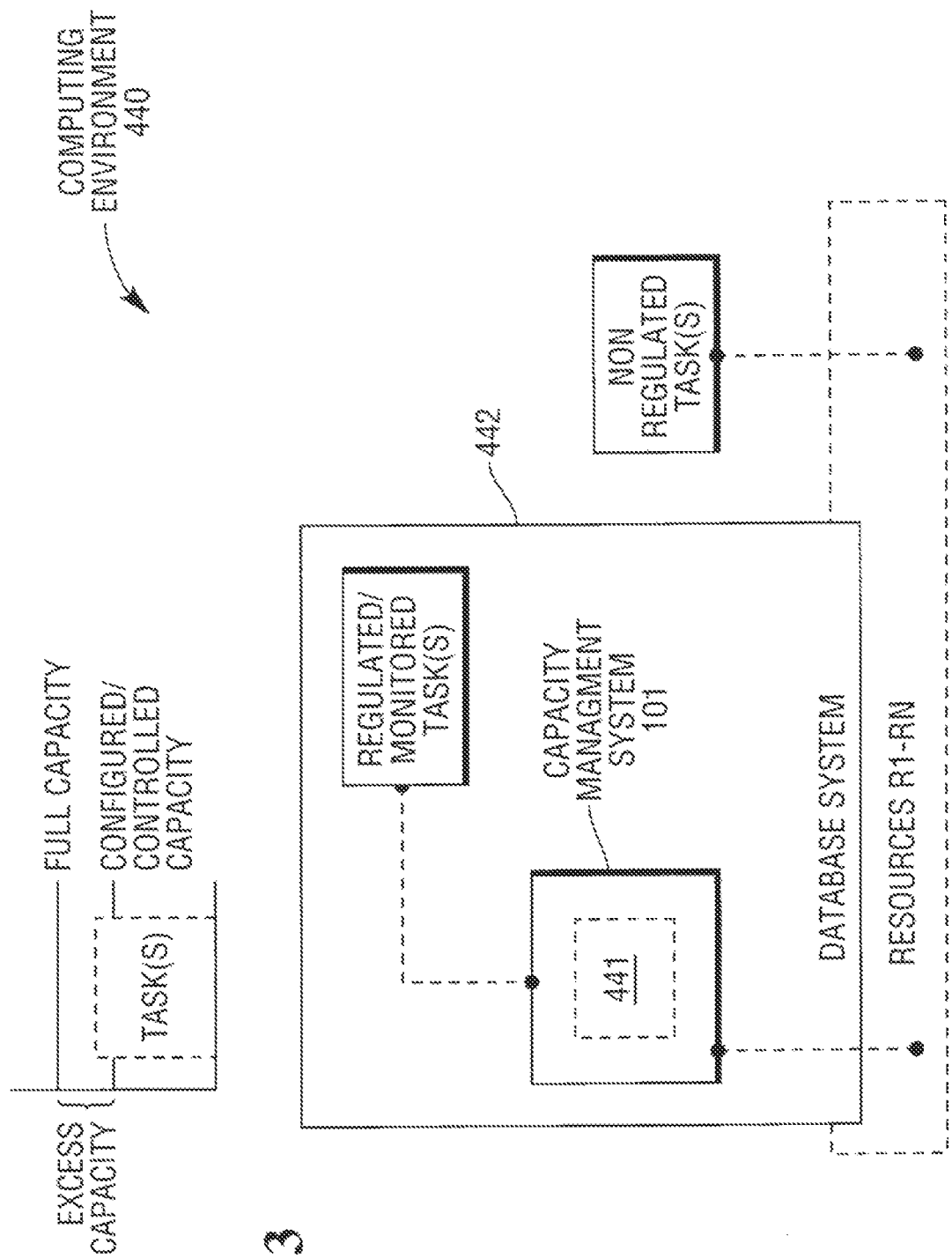
FIG. 13 depicts a computing environment in accordance with one embodiment of the invention.

As noted above, excess capacity can be effectively managed for a database or a database system in a capacity controlled computing environment. To further elaborate, FIG. 13 depicts a computing environment 440 in accordance with one embodiment of the invention. Referring to FIG. 13, the computing environment 440 includes a database system 442 and multiple resources R1-RN, at least some of which can be part of the database system 442. As those skilled in the art will readily know, the database system 442 can be operable to store data in a database (not shown separately) effectively provided by the database system 442. The database system 442 can access at least one of the resources R1-RN to process data associated with the database.

Moreover, the database 442 can also be operable to regulate work (e.g., database tasks or activities). By way of example, the database system 442 can regulate access or extent of access made by one or more database tasks to one or more of the resources R1-RN. As such, the database system 442 can, for example, include a capacity management system 101 operable to regulate one or more database tasks or activities with respect to access or extent of access to the resources R1-RN.

Typically, in the database system 442, regulation of database work, such as, various database tasks or activities (e.g., database requests and queries) is relatively more useful. As such, database system 442 can be configured to regulate at least some work (e.g., non-database work, such as, system tasks or activities) but some tasks, activities, or operations (e.g., a non-database task or activity) may not be regulated in the database system 442. This work can, for example, be regulated by a database management 101 which can be provided in accordance with the techniques described above.

In effect, the capacity management system 101 can configure and/or control the capacity of the database system 442 so that a desired or a target capacity below the full capacity of the database system 442 can be achieved and/or maintained. As a result, excess capacity can be available for use but be made effectively inaccessible to the database system 442.

It will be appreciated that in accordance with the embodiment depicted in FIG. 13, the excess capacity, which can remain effectively unused and/or inaccessible by the database system 442, can be made available by the capacity management system 101 to the database system 442 for various purposes, including error handling and optimization (or further optimization) of execution of database queries. As such, the capacity management system 101 can include an excess-capacity management system 441 operable to effectively manage the excess capacity of the database system 442.

Specifically, the excess-capacity management system 441 can determine whether to allow excess capacity available to the database system 442 to be used to perform one or more operations and allow or deny use of excess capacity accordingly. The determination of whether to allow excess capacity to be used can be made based on various criteria, including, for example, when there is perceived need to handle an error condition (e.g., "run-away" query). As another example, it can be determined to allow the use of excess capacity when there is a perceived need to further optimize a query (e.g., when: (a) plans whose estimated time does not achieve the queries' defined SLG, (b) expensive plans whose estimated elapsed time or resources consumed exceeds a configurable threshold or (c) highly complex queries identified as those whose number of execution operations or steps exceeds a configurable threshold).

It should be noted that the excess-capacity management system 441 can be operable to allow only one or more selected operations to use the excess capacity, for example, by allowing only the selected operation(s) to use a particular resource or use the resource in a manner that would exceed the allotted use of the resource in accordance with the configured (limited) capacity made available to the database system 442. As a result, a selected operation can be allowed access to a resource not normally available or be granted use of a resource in a manner that would not be normally allowed (e.g., less access delay time, longer access time).

It should be noted that the excess-capacity management system 441 can be operable during the processing of database requests and when the database system 442 is active to determine whether to allow excess capacity available to the database system 442 to be used to perform one or more operations and allow or deny use of excess capacity accordingly. In other words, excess-capacity management system 441 can manage excess capacity for the database system 442 in a dynamic manner at runtime or at execution time.

Figure 14:
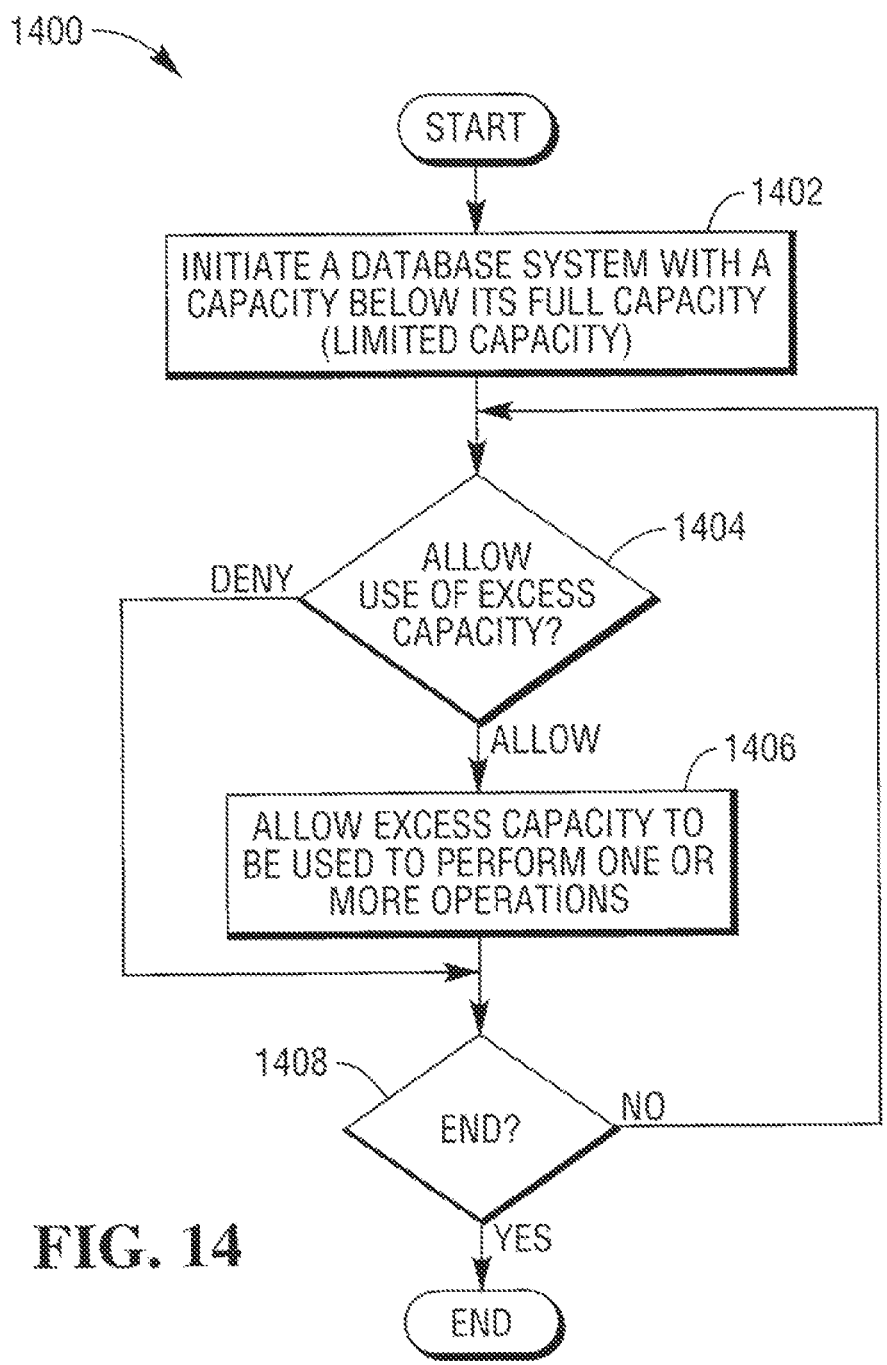
FIG. 14 depicts a method for operating a database or database system in accordance with one embodiment of the invention

To further elaborate, FIG. 14 depicts a method 1400 for operating a database or database system in accordance with one embodiment of the invention. Method 1400 can, for example, be performed by the excess-capacity management system 441 depicted in FIG. 13.

Referring to FIG. 14, initially, a database system is initiated (1402) with capacity below its full capacity. In other words, the database system is configured to operate at a limited capacity with at least a portion of the capacity being made effectively inaccessible to the database. When the database system is operational, it is determined (1404) whether to allow use of excess capacity to perform one or more operations associated with the database system. By way of example, it can be determined (1404) whether to allow an error condition to be effectively handled using excess capacity, or whether to further optimize a query. If it is determined (1404) to allow use of the excess capacity, one or more operations can be allowed (1406) to use excess capacity. By way of example, a query may be processed or further optimized using excess capacity. On the other hand, if it is determined (1404) not to allow excess capacity to be used, use of excess capacity is denied. In effect, the method 1400 can continue to determine (1404) whether to allow use of excess capacity while the database system is operational until it is determined (1408) to end the operations of the database system, for example, as a result of a system shutdown.

Figure 15:
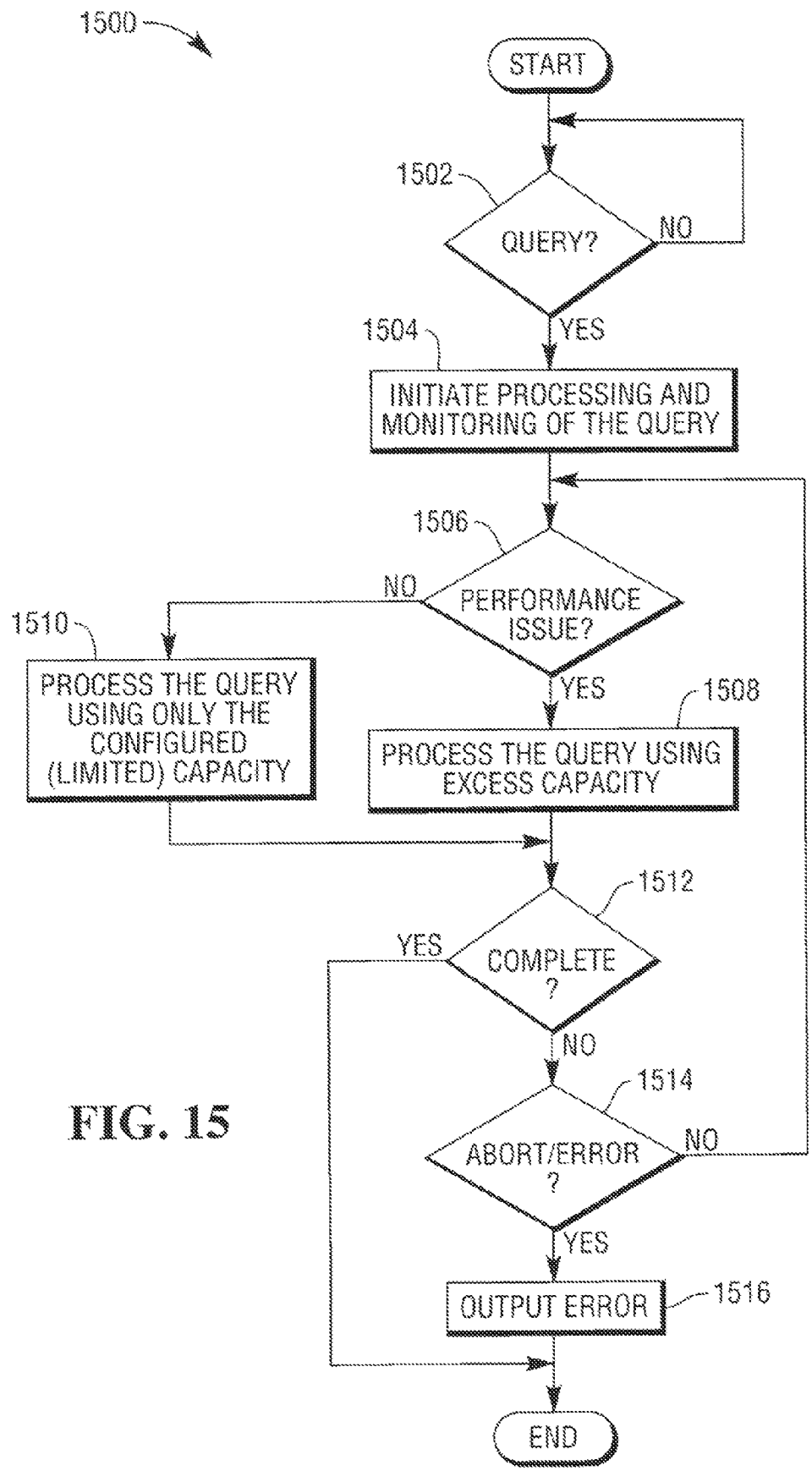
FIG. 15 depicts a method for managing excess capacity of a database or database system in accordance with one embodiment of the invention.

FIG. 15 depicts a method 1500 for managing excess capacity in a capacity controlled database system in accordance with one embodiment of the invention. Method 1500 can, for example, be performed by the excess-capacity management system 441 depicted in FIG. 13.

Referring to FIG. 15, initially, it is determined (1502) whether a database query is received. In effect, method 1500 can wait to receive a database query for processing. If it determined (1502) that a database query has been received, the processing and monitoring of the processing of the query is initiated (1504).

Next, based on the monitoring of the processing of the query, it is determined (1506) whether there is a performance issue that merits use of excess capacity. By way of example, it can be determined (1506) whether completion of execution of a database query would hinder system performance. As a result, a query can be processed (1508) using excess capacity available to the database system if it is determined (1506) that there is performance issue that merits use of the excess capacity. Otherwise, the query is not allowed to use excess capacity and would be processed (1510) using only the configured or allotted capacity (limited capacity).

It should be noted that during the processing of a database query, it can be determined (1506) to use the excess capacity until it is determined (1512) that the processing of the query has completed. However, the database query may be aborted if it is determined (1514) to abort the query prior to the completion of the processing, for example, if use of the excess capacity is not desirable or feasible. Accordingly, if it determined (514) to abort the query, an error can be output (1516). However, it should also be noted that in accordance with the method 1500, processing of queries can be completed using the excess capacity at least for some, if not all, of the queries that would conventionally just be aborted. Method 1500 ends after the completion (514) of the processing of the query or after an error is output (1516).

Figure 16:
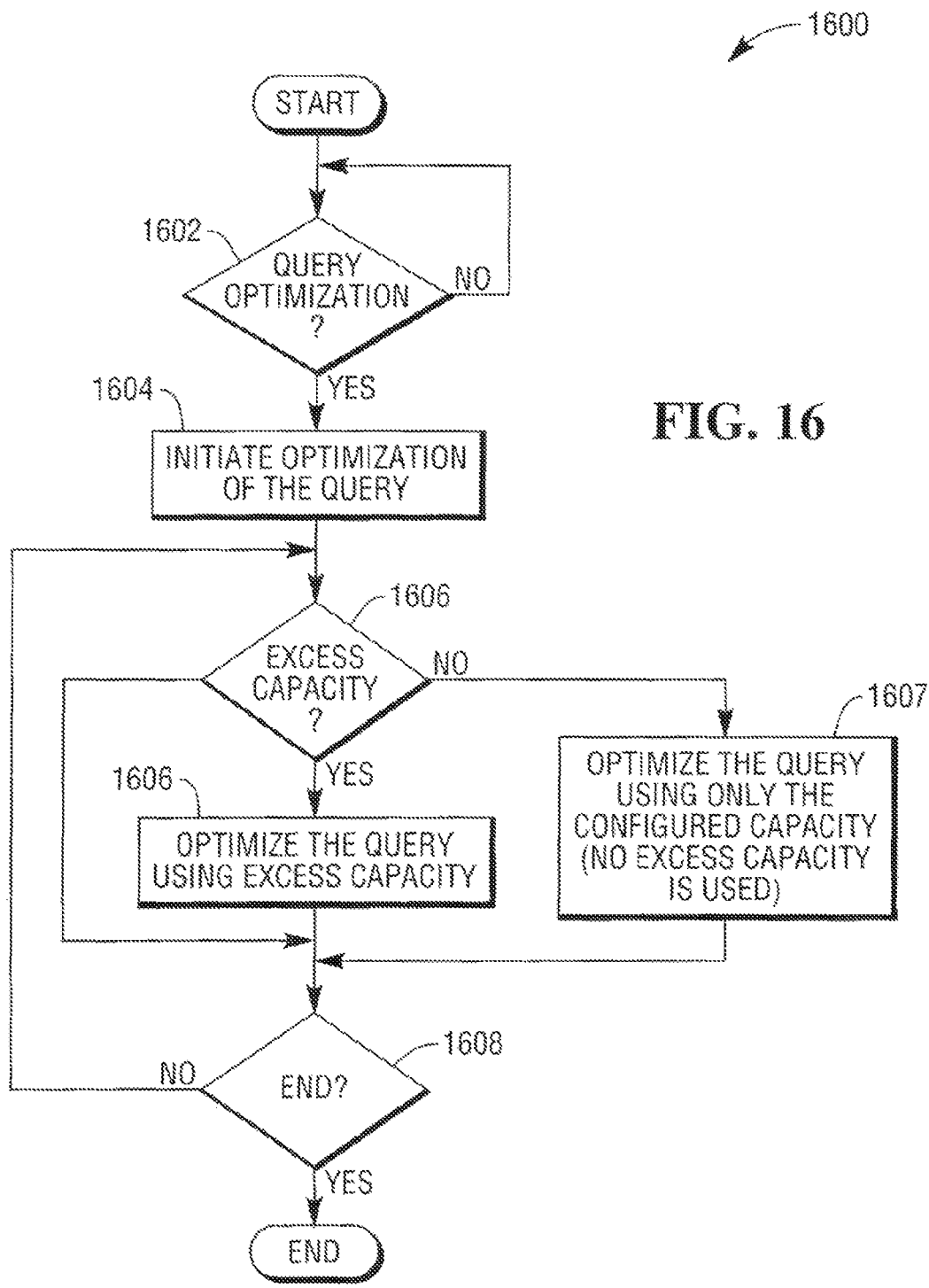
FIG. 16 depicts a method for managing excess capacity of a database or database system in accordance with another embodiment of the invention.

FIG. 16 depicts a method 1600 for managing excess capacity in a capacity controlled database system in accordance with another embodiment of the invention. Method 1600 can, for example, be performed by the excess-capacity management system 441 depicted in FIG. 13.

Referring to FIG. 16, initially, it is determined (1602) whether to optimize (or further optimize) a database query. In effect, method 1600 can wait for a determination (1602) to optimize a database query. If it is determined (1602) to optimize a database query, the optimization of the database query is initiated (1604) and it is determined (1606) whether to use excess capacity available to optimize or further optimize the database query. The excess capacity is available to the database system but is not allotted for normal database operations. Accordingly, excess capacity can be used (1606) to optimize or further optimize the database query, if it is determined (1606) to use excess capacity. Otherwise, the database query can be optimized or further optimized (1607) using only the allotted or configured capacity (i.e., excess capacity is not used to optimize the database query.

It should be noted that during the optimization of a database it can be determined (1606) to use excess capacity and excess capacity may be used after optimization is performed using only allotted or configured capacity. Furthermore, it is possible to stop usage of excess capacity for optimization of the database query and/or resume usage of excess capacity after it has been stopped. Method 1600 end after it is determined (1612) to end the optimization of the database query (e.g., when it determined that an optimal plan has been achieved and/or it is not feasible or desirable to further optimize the query).

It should also be noted that in accordance with the techniques of the invention, more expansive and thorough optimization can be performed using excess capacity which may not be feasible in conventional systems. In addition, the techniques of the invention provide elegant and graceful solutions that allow overcoming query scheduling mistakes which are, by in large, inherent to the limitations of the estimation technologies.

Additional techniques related to controlling the capacity of a database system are further discussed in the following two (2) U.S. Patent Applications which are both hereby incorporated by reference herein for all purposes: (i) U.S. patent application Ser. No. 13/249,922 entitled: "regulating capacity and managing services of computing environments and systems that include a database," by DOUGLAS P. BROWN et al., and (ii) U.S. patent application Ser. No. 13/250,006 entitled: "Managing capacity of computing environments and system that include a database," by John Mark Morris et al.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method to manage capacity of a database system, wherein the database system that includes one or more database nodes operable to process data associated with a database, wherein the one or more database nodes include one or more physical processors, and wherein the computer-implemented method comprises:

configuring the database system to operate at an allotted limited capacity below its full capacity to process database queries, by configuring at least one of the one or more database nodes to operate at an allotted usage capacity below its full usage capacity to process database queries, wherein an excess capacity in relation to the allotted limited usage capacity is available to the database system on demand;

determining by the one or more physical processors that one or more problematic operations associated with the database have occurred, wherein the one or more problematic operations include at least one of: (i) one or more database queries that have been determined to encounter an error during execution, and (ii) execution of one or more database queries have been determined not to be optimal;

determining by the one or more physical processors whether to allow excess capacity that is available to the database system on demand in relation to the allotted limited capacity to be used to resolve the problematic operations by at least performing one or more selected operations pertaining to at least one of: processing of a selected one or more of the database queries that have encountered an error, and optimization of a selected one or more database queries determined not to be optimal; and when the determining determines to allow the excess capacity available to the database system to be used to perform the one or more selected operations:

allowing by the one or more physical processors the excess capacity of the database system to be used on demand to perform the one or more selected operations, by allowing the at least one database node to exceed its allotted usage capacity on demand to perform the one or more operations, not allowing by the one or more physical processors the excess capacity of the database system to be used to process one or more of the database queries that have not been selected for least one of: processing of the selected one or more of the database queries that has encountered an error, and the optimization of the selected one or more of the database queries.

2. The computer-implemented method of claim 1, wherein the allowing the access capacity to be used to perform the one or more selected operations comprises:

not allowing at least one or more operations associated with the database to use the excess capacity.

3. The computer-implemented method of claim 1, wherein the determining whether to allow excess capacity available to the database system to be used to perform one or more selected operations comprises:

determining whether an error condition has occurred.

4. The computer-implemented method of claim 3, wherein the error condition is associated with scheduling a database query for execution.

5. The computer-implemented method of claim 1, wherein the determining whether to allow excess capacity available to the database system to be used to perform the selected one or more operations comprises:
determining whether to optimize or further optimize a database query.

6. The computer-implemented method of claim 1, wherein the determining whether to allow excess capacity available to the database system to be used to perform the one or more selected operations comprises one or more of the following:
(a) identifying an execution plan with an estimated completion time that does meet a goal or a requirement,
(b) identifying an execution plan with an execution time and/or resource consumption time that exceed a threshold, and
(c) identifying a query with a number of operations that exceed a threshold.

7. An apparatus, comprising:
one or more processors operable to:
process and store data for a database system configured to operate at a limited capacity below its full capacity;
configure the database system to operate at an allotted limited capacity below its full capacity to process database queries, by configuring at least one of the one or more database nodes of the database system to operate at an allotted usage capacity below its full usage capacity to process database queries, wherein an excess capacity in relation to the allotted limited usage capacity is available to the database system on demand;
determine that one or more problematic operations associated with the database have occurred, wherein the one or more problematic operations associated with the database include at least one of: (i) one or more database queries that have been determined to encounter and error, and (ii) execution of one or more database queries determined not to be optimal;
determine whether to allow excess capacity available to the database on demand to be used to resolve one or more problematic operations associated with the database;
allow the excess capacity to be used on demand to resolve the one or more problematic operations when the determining determines to allow the excess capacity available to the database system to be used on demand to perform the one or more operations associated with the database; and
not allowing the excess capacity to be used to perform one or more other operations associated with the database that are determined not be problematic.

8. The apparatus of claim 7, wherein the one or more operations pertain to processing a database query that has encountered an error.

9. The apparatus of claim 7, wherein the one or more operations pertain to optimization of a database query.

10. The apparatus of claim 7, wherein the allowing the access capacity to be used to perform the one or more operations only allows the excess capacity to be used to perform the one or more operations.

11. The apparatus of claim 7, wherein the allowing the access capacity to be used to perform the one or more operations comprises:
not allowing at least one or more operations associated with the database to use the excess capacity.

12. The apparatus of claim 7, wherein the determining whether to allow excess capacity available to the database system to be used to perform one or more operations comprises:
determining whether an error condition has occurred.

13. The apparatus of claim 12, wherein the error condition is associated with scheduling a database query for execution.

14. The apparatus of claim 7, wherein the determining whether to allow excess capacity available to the database system to be used to perform one or more operations comprises:
determining whether to optimize or further optimize a database query.

15. A non-transitory computer readable storage medium storing at least executable computer code for managing capacity of a database system that includes one or more database nodes operable to process data associated with a database, wherein the database system is configured to operate at a limited capacity below its full capacity, and wherein the non-transient computer readable storage medium includes:
executable computer code operable to configure the database system to operate at an allotted limited capacity below its full capacity to process database queries, by configuring at least one of the one or more database nodes of the database system to operate at an allotted usage capacity below its full usage capacity to process database queries, wherein an excess capacity in relation to the allotted limited usage capacity is available to the database system on demand;
executable computer code operable to determine whether to allow excess capacity available to the database system on demand to be used to perform one or more problematic operations associated with processing of the data by the one or more database nodes, wherein the one or more operations associated with the database include: (i) one or more database queries that have been determined to encounter and error, and (ii) optimizations of one or more database queries determined not be optimal; and
executable computer code operable to allow the excess capacity to be used to perform the one or more problematic operations when the determining determines to allow the excess capacity available to the database system on demand to be used to perform the one or more problematic operations associated with processing of the data by the one or more database nodes; and
executable computer code operable not to allow the excess capacity to be used to perform one or more other operations associated with the database that are determined not to be problematic.

16. The non-transitory computer readable storage medium of claim 15, wherein the one or more operations pertain to processing a database query that has encountered an error.

17. The non-transitory computer readable storage medium of claim 16, wherein the database query is selected as a result of scheduling mistake due to a limitation of an estimation technology used to estimate resource usage of the database query.

18. The non-transitory computer readable storage medium of claim 15, wherein the one or more operations pertain to optimization of a database query.

19. The non-transitory computer readable storage medium of claim 18, wherein the database query is a selected database query requiring a more extensive and through optimizations than a plurality of other database queries.

\* \* \* \* \*